US010507916B2

United States Patent
Gomez Gutierrez et al.

(10) Patent No.: US 10,507,916 B2
(45) Date of Patent: Dec. 17, 2019

(54) UNMANNED AERIAL VEHICLES AND RELATED METHODS AND SYSTEMS

(71) Applicant: Intel Corporation, Santa Clara, CA (US)

(72) Inventors: David Gomez Gutierrez, Tlaquepaque (MX); Rafael De La Guardia Gonzalez, Teuchitlan (MX); Jose I. Parra Vilchis, Gaudalajara (MX); Rodrigo Aldana Lopez, Zapopan (MX)

(73) Assignee: Intel Corporation, Santa Clara, CA (US)

( * ) Notice: Subject to any disclaimer, the term of this patent is extended or adjusted under 35 U.S.C. 154(b) by 151 days.

(21) Appl. No.: 15/639,679

(22) Filed: Jun. 30, 2017

(65) Prior Publication Data

US 2019/0002103 A1 Jan. 3, 2019

(51) Int. Cl.
| B64C 39/02 | (2006.01) |
| H04L 29/08 | (2006.01) |
| G05D 1/00 | (2006.01) |
| A63F 13/20 | (2014.01) |
| H04W 4/02 | (2018.01) |

(Continued)

(52) U.S. Cl.
CPC ............ B64C 39/024 (2013.01); A63F 13/20 (2014.09); G05D 1/0038 (2013.01); G05D 1/0088 (2013.01); H04L 67/125 (2013.01); H04L 67/38 (2013.01); H04W 4/023 (2013.01);

(Continued)

(58) Field of Classification Search
CPC .... A63F 13/20; G05D 1/0038; G05D 1/0088; G05D 1/101; G05D 1/104; B64C 2201/146; H04L 67/125; H04N 7/185; G02B 27/017; G01C 1/00; G06F 8/20; G06Q 50/28
See application file for complete search history.

(56) References Cited

U.S. PATENT DOCUMENTS

| 6,493,609 B2 * | 12/2002 | Johnson | ................. G05D 1/101 |
| | | | 340/979 |
| 8,060,270 B2 * | 11/2011 | Vian | ..................... G05D 1/104 |
| | | | 348/144 |

(Continued)

OTHER PUBLICATIONS

Scheidt et al., Cooperating unmanned vehicles, 2005, IEEE, p. 326-331 (Year: 2005).*

(Continued)

*Primary Examiner* — McDieunel Marc
(74) *Attorney, Agent, or Firm* — Hanley, Flight & Zimmerman, LLC

(57) ABSTRACT

Unmanned aerial vehicles include a processor to determine whether a first location of an unmanned vehicle and a second location of a virtual event is within a threshold distance; and a game experience controller to: control the unmanned vehicle based on a first command associated with a non-augmented state of the unmanned vehicle in response to the first location of the unmanned vehicle and the second location of the virtual event being outside of the threshold distance; and in response to the first location of the unmanned vehicle and the second location of the virtual event being within the threshold distance, control the unmanned vehicle based on a second command associated with an augmented state of the unmanned vehicle to simulate the unmanned vehicle being affected by the virtual event.

25 Claims, 13 Drawing Sheets

(51) Int. Cl.
  *H04L 29/06* (2006.01)
  *H04W 4/40* (2018.01)
  *H04N 7/18* (2006.01)

(52) U.S. Cl.
  CPC ......... *H04W 4/40* (2018.02); *B64C 2201/146* (2013.01); *H04N 7/185* (2013.01)

(56) References Cited

U.S. PATENT DOCUMENTS

| | | | | |
|---|---|---|---|---|
| 8,078,357 | B1* | 12/2011 | Trytten | G06F 8/20 700/245 |
| 9,070,101 | B2* | 6/2015 | Abhyanker | G01C 1/00 |
| 2011/0221656 | A1* | 9/2011 | Haddick | G02B 27/017 345/8 |
| 2014/0136414 | A1* | 5/2014 | Abhyanker | G06Q 50/28 705/44 |
| 2014/0222248 | A1* | 8/2014 | Levien | B64C 39/024 701/2 |

OTHER PUBLICATIONS

Cummings et al., Task Versus Vehicle-Based Control Paradigms in Multiple Unmanned Vehicle Supervision by a Single Operator, 2014, IEEE, p. 353-361 (Year: 2014).*

Lin et al., Toward a generalized architecture for unmanned underwater vehicles, 2011, IEEE, p. 2368-2376 (Year: 2011).*

Berg et al., Unmanned vehicle control using simulation and virtual reality techniques, 2001, IEEE, p. 895-900 (Year: 2001).*

Scheidth et al., Cooperating unmanned vehicles, 2005, IEEE, p. 326-331 (Year: 2005).*

Hayat et al., Survey on Unmanned Aerial Vehicle Networks for Civil Applications: A Communications Viewpoint, 2016, IEEE, p. 2624-2661 (Year: 2016).*

* cited by examiner

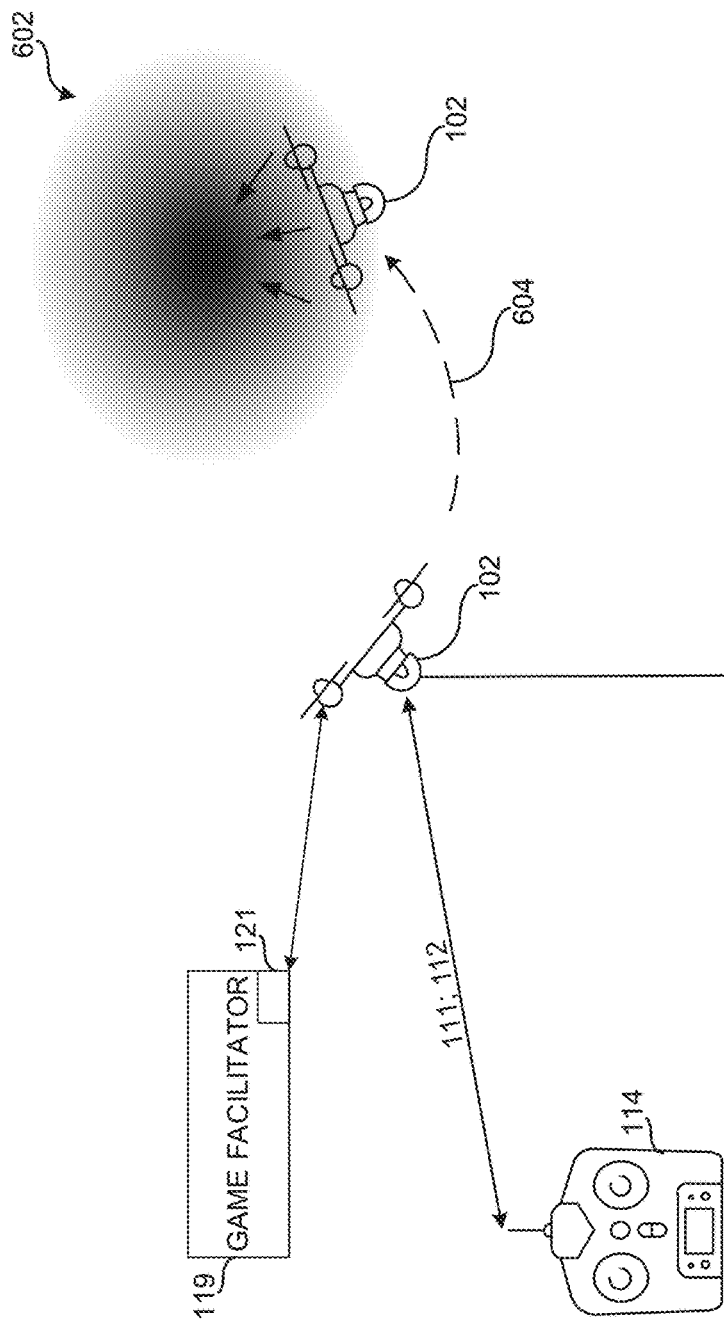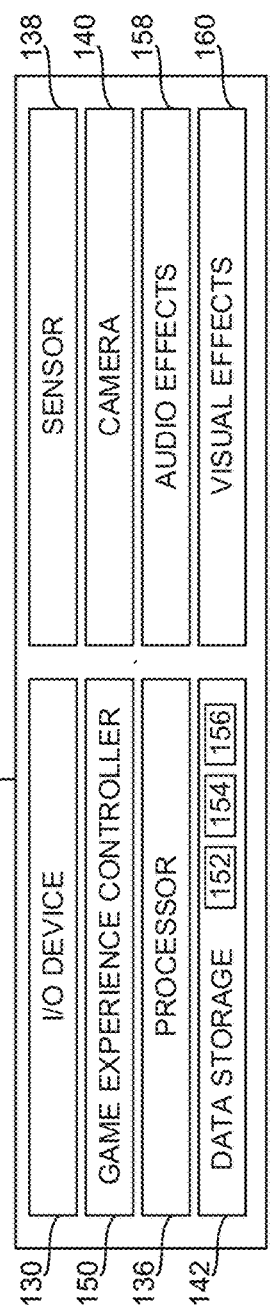
FIG. 6

UNMANNED AERIAL VEHICLES AND RELATED METHODS AND SYSTEMS

FIELD OF THE DISCLOSURE

This disclosure relates generally to unmanned aerial vehicles, and, more particularly, to unmanned aerial vehicles and related methods and systems.

BACKGROUND

In recent years, unmanned aerial vehicles (UAVs) have begun to be used in competitions and/or gaming activities. Some such competitions include UAV racing in which competitors race their respective UAVs over a predefined course. In some examples, the UAVs include one or more cameras that provide a live-stream camera feed for a first-person view from the UAV. In such examples, the competitors are able to control their UAVs based on information obtained via the live-stream camera feeds.

BRIEF DESCRIPTION OF THE DRAWINGS

FIG. 6 is a schematic illustration of an example unmanned aerial vehicle being affected by a virtual attractive hole in accordance with the teachings of this disclosure.

The figures are not to scale. Wherever possible, the same reference numbers will be used throughout the drawing(s) and accompanying written description to refer to the same or like parts.

DETAILED DESCRIPTION

Figure 1:
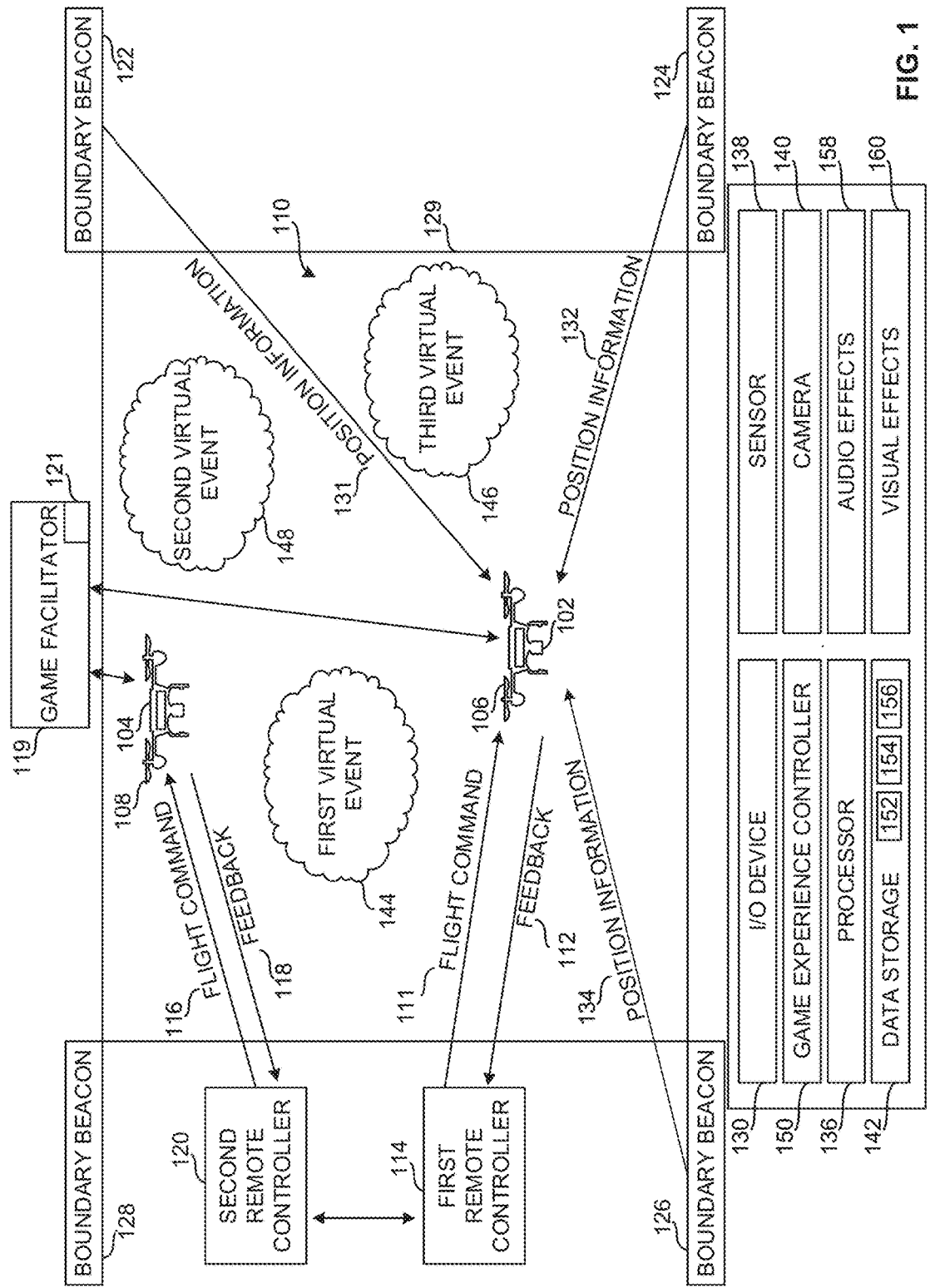
FIG. 1 is a schematic illustration of an example environment of use in which example unmanned aerial vehicles can be operated in accordance with the teachings of this disclosure.

Examples disclosed herein relate to aerial vehicles (e.g., unmanned aerial vehicles, drones, semi-autonomous drones, autonomous drones) that enable participants of varying experience levels to use the example UAVs in competitions, games and/or other augmented reality scenarios. To enhance a user's experience when participating in a competition and/or a game, examples disclosed herein alter the flight routines and/or maneuvers performed by an operator of the UAV to change the physical flying characteristics and/or dynamics of the UAV. In other words, examples disclosed herein enable the look and/or feel of UAVs to change in real-time based on a situation within the game or otherwise. Some of the competitions and/or games in which example UAVs disclosed herein may participate include UAV racing and/or UAV combat, with or without the use of a headset. Of course, example UAVs disclosed herein may be used for any purpose with or without a headset and/or other display (e.g., a head-mounted display).

In some examples, to enable the UAVs to react to different scenarios presented within a competition and/or game, disclosed example UAVs are structured and/or configured to simulate the UAV being under the influence of a virtual force by executing example flight routines. For example, the UAV may execute example flight routines that simulate the UAV being impacted by a virtual laser and/or projectile, and/or the UAV may execute example flight routines that simulate the UAV being under the influence of a virtual tractor beam, etc.

To enable the UAVs to react to these different virtual scenarios and/or virtual events, example UAVs disclosed herein include example on-board flight controllers that are structured and/or configured to cause the UAVs to perform maneuvers and/or flight routines based on a received command, a game being played and/or the location of the UAV and/or a virtual event(s) within the game. Thus, the example UAVs are provided with flight controllers that control the UAVs in gaming scenarios and/or command the UAVs to simulate reacting to different virtual events within the gaming scenarios.

To enable users (such as users with less experience) to use the UAVs in competitions, games and/or otherwise, in some examples, the flight controllers are configured and/or structured to perform a flight routine that is relatively more complex than the user input, and/or flight command(s) received from the user. For example, based on one or more relatively simple input direction commands and/or a velocity commands, the example UAVs may perform a pitchback, a split S, a high Yo-Yo, a low Yo-Yo, a chandelle, etc., which is more complex than the received command(s). Thus, examples disclosed herein enable semi-autonomous navigation and/or autonomous navigation during different flying modes with little or no input from a user.

In some examples, the example UAVs support flight commands that cause the UAVs to have different attributes depending on the game being played. The attributes may include a maximum speed of the UAV, an agility level of the UAV, etc. Additionally and/or alternatively, the attributes may be based on the location of the UAV within the game being played and/or a scenario within the game. For example, if the virtual flight conditions of the game include clear flight conditions, the UAV may be assigned a first attribute, characteristic and/or personality that causes the UAV to respond nimbly to a user command received. However, if the virtual flight conditions of the game include stormy flight conditions, the UAV may be assigned a second attribute, characteristic and/or personality that causes the UAV to respond sluggishly to the same user command. In other words, the behavior and/or responsiveness of the UAV may be affected by virtual conditions and/or the virtual environment presented within the game. Some example virtual conditions include virtual smoke that reduces the visibility at the user-level (e.g., the headset worn by the user), an example virtual attractive hole that draws and/or bends a trajectory of the UAV(s) toward the virtual attractive hole, an example virtual boost track that accelerates the UAV, etc.

In some disclosed examples, to affect how a UAV interacts with other UAVs within the game, the UAVs are provided with virtual weapons and/or other virtual offensive tools, and/or virtual defensive tools. In some such examples, the UAVs include onboard flight controllers that cause the UAVs to react/perform a flight routine and/or maneuver to simulate the virtual event affecting the UAV. For example, a first UAV may emit a virtual tractor beam that draws a second UAV toward the first UAV if the second UAV enters the space defined by the virtual tractor beam. Additionally or alternatively, in some examples, the second UAV includes a virtual protective shield and/or power shield that repels the first UAV from the second UAV and/or otherwise prevents the second UAV from being harmed (e.g., hit by bullets, etc.). Additionally or alternatively, in some examples, the first UAV fires virtual bullets that virtually damages the second UAV if one of the virtual bullets hits the second UAV.

In such examples, if the second UAV is virtually damaged, the flight characteristics of the second UAV change to simulate the second UAV being damaged and/or being affected by the virtual event. The virtual event may affect the second UAV based on a location of the second UAV and a location of the virtual event being within a threshold distance from the location of the second UAV. For example, if examples disclosed herein determine that a virtual bullet is within a threshold distance of the second UAV corresponding to the virtual bullet impacting the second UAV, the second UAV may be commanded to perform a random walk, a controlled spin, etc., and/or some other maneuver for a threshold amount of time prior to again flying according to the input commands received from the user. The threshold amount of time may be between about 5 and 10 seconds, a relatively small amount of time, etc.

By changing the responsiveness of the UAV(s) to the same flight commands depending on the attribute, characteristic and/or personality assigned to the UAV and/or, generally, the virtual event(s) affecting UAV, the user experience may be greatly enhanced by changing an amount of effort required to control the UAV. For example, a UAV may have a first level of responsiveness when flying through a first virtual event within a game arena and have a second level of responsiveness when flying through a second virtual event within the game arena. The flight commands may be generated by a user using a UAV controller such as, for example, a joystick type controller (e.g., a velocity controller), a smart device and/or a controller associated with an immersive experience with Augmented Reality (AR). In some examples, haptic feedback is received by the controllers to enhance the mode being played in the game, scoring in the game and/or enabling first-person viewer experiences based on image/video data received.

To enable the example UAVs to take on different flight characteristics and/or personalities and/or to execute flight maneuvers (e.g., complex flight maneuvers) based on encountering a virtual event(s), in some examples, sensors are used to determine the position of the UAV(s). The sensors may include an internal measurement unit (IMU), a camera(s) (e.g., RealSense™ camera), one or more position sensors and/or other sensors in an example UAV arena and/or wherever the UAV is being used (e.g., sensors external to the UAV). Some of these sensors enable localization methods for semi-autonomous flight in areas where the global positioning system (GPS) is not accessible (e.g., inside a building) by using sensors that determine the position of the UAV without the use of GPS.

In examples in which the sensors are external to the UAV, the sensors may include an infrared camera(s) that detects one or more fiducial markers onboard the UAV, a light system (e.g., a structured light system), an ultrasound beacon, etc. Thus, the position of the UAVs may be determined using sensors and/or technology onboard the UAV and/or sensors and/or technology offboard the UAV. Regardless of the number and/or type(s) of sensor(s) implemented to determine the position of the UAV(s), the example sensors may be structured and/or configured to determine the position(s) of the UAV(s) within a threshold distance. The threshold distance may be approximately one centimeter (cm). However, the threshold distance may be any other distance.

Additionally or alternatively, in examples in which the sensors are external to the UAV, the area where the UAV is being used (e.g., the UAV arena) may include one or more sensors, visual landmarks, infrared beacons and/or ultrasound beacons, etc. to enable the position of the UAV to be determined and/or to assist with controlling the UAV. In some examples, to enable the position of a UAV(s) to be determined, an example mat is used that includes distinct game elements, such as one or more base stations for multiple players. The mat may include one or more visual cues for UAV localization using a cameras onboard the UAVs. In such examples, the mat enables the game to be portable and/or scalable. In some examples, the mat includes one or more sensors (e.g., integrated sensors) and/or controllers that generates one or more virtual fences and/or physical fence(s) and/or cage(s) that constrain the UAV(s) within a space and/or volume. For example, the mat may include a beacon-based location system, where each beacon broadcasts its location to assist the UAV with determining its location within the game arena, etc. To enable the location arena to be defined and/or to enable the location of the UAV(s) participating in the game to be determined, the beacon-based location system may include ultrawideband (UWB) radio ranging, sonar, infrared cameras and/or other sensors.

To determine the location of the UAVs relative to one another within the gaming system, in some examples, the example UAVs include onboard sensing capabilities. Additionally or alternatively, to determine the location of the UAVs relative to one another within the gaming system, in some examples, the gaming system includes centralized communication capabilities (e.g., an example game facilitator) that enable the UAVs that participate in the game to be made smaller based on, for example, less hardware being provided on the UAV(s) itself. In other words, in some examples, including the centralized communication capabilities and/or the game facilitator enables processing (e.g., at least some processing) to take place elsewhere than on the UAV itself.

To begin a game using the example UAVs disclosed herein, an example system may be initialized. In some examples, initializing includes initializing the example UAV (s), initializing the example mat(s) defining the arena and/or initializing the example controller(s) (e.g., the wireless controller(s)) used to control the UAV(s). While some of the examples disclosed herein mention controlling the UAV(s) in a non-augmented state based on a user-provided command(s) and controlling the UAV(s) in an augmented state based on a flight command(s) associated with a virtual event, in other examples, the UAV(s) may be controlled autonomously in the non-augmented state and/or the augmented state. In some such examples, some of the UAVs participating in the game and/or competition may be user controlled and others of the UAVs participating in the game and/or competition may be semi-autonomously controlled and/or autonomously controlled.

FIG. 1 illustrates first and second example unmanned aerial vehicles (UAVs) 102, 104 having respective propulsion sources, engines and/or propellers 106, 108. In this example, the first and second UAVs 102, 104 are navigating through an example arena and/or environment 110 and/or participating in a game and/or competition. In the illustrated example, the first UAV 102 receives flight commands 111 from and provides feedback 112 to a first example remote controller 114. Similarly, in the illustrated example, the second UAV 104 receives flight commands 116 and provides feedback 118 to a second example remote controller 120. In some examples, the flight commands 111, 116 include velocity commands, direction commands and, more generally, commands associated with flying and/or controlling the respective first and second UAVs 102, 104 within the environment 110.

To enable data to be conveyed between the first and second UAVs 102, 104 and/or to enable the game and/or competition to take place, an example game facilitator 119 is included. In some examples, the game facilitator 119 generates and/or accesses position and/or other data relating to a virtual event associated with the first UAV 102, and/or otherwise receives position and/or other data relating to the first UAV 102. In some examples, the game facilitator 119 generates and/or accesses position and/or other data relating to a virtual event associated with the second UAV 104 and/or otherwise receives position and/or other data relating to the second UAV 104. In some examples, the position data may be provided to the first UAV 102, the first remote controller 114, the second UAV 104 and/or the second remote controller 120. The position data and/or other data relating to a virtual event(s) may be accessed from game data 121 at the game facilitator 119.

To enable the position of the first and second UAVs 102, 104 to be determined within the environment 110, first, second, third and fourth example boundary beacons 122, 124, 126, 128 are included in the illustrated example. In some examples, the boundary beacons 122, 124, 126, 128 generate and/or transmit position information to the UAVs 102, 104 and/or define an example boundary 129 for the environment 110. The boundary beacons 122, 124, 126, 128 may be infrared beacons, ultrasound beacons and/or other transmitting device(s). In examples in which the environment 110 is defined and/or implemented using a mat and/or other physical structure, the beacons 122, 124, 126, 128 may be integral to and/or otherwise associated with the mat.

In some examples, to determine the position of the first UAV 102, the first UAV 102 accesses, via an example input/output device 130, first position information 131 from the first boundary beacon 122, second position information 132 from the second boundary beacon 124, and third position information 134 from the third boundary beacon 126, etc. Once accessed, in some examples, an example processor 136 of the first UAV 102 processes the first, second and third position information 131, 132, 134 to determine the position of the first UAV 102 within the environment 110. Thus, in some examples, the location of the first and/or second UAVs 102, 104 can be determined by accessing the position information 131, 132, 134 from at least three of the four boundary beacons 122, 124, 126, 128. The position information 131, 132, 134 may include, for example, mutlilateration data with intersecting ranges from different boundary beacons 122, 124, 126, 128 as spheres to determine the location of the UAV. In some examples, the input/output device 130 is implemented by and/or includes a radio frequency (RF) transceiver module.

Additionally or alternatively, in some examples, the boundary 129 is generated using geo-fencing software, etc., and/or the position of the first UAV 102 is determined using an example sensor 138 and/or an example camera 140 of the first UAV 102. In some examples, the sensor 138 is implemented by an example inertial measurement unit (IMU). When the position of the first UAV 102 is determined using image/video data, in some examples, image/video data is obtained from the camera 140 and compared, via the processor 136, to reference data stored in an example data storage 142 of the first UAV 102 and/or within the game data 121. The reference data may include real structures, real topography, etc., of the environment 110, and/or virtual structures, virtual topography, virtual events, etc. of the environment 110.

As shown in the example of FIG. 1, the environment 110 includes a first example virtual simulation, event and/or force 144, a second example virtual simulation, event and/or force 146 and a third example virtual simulation, event and/or force 148, referred to generally as example virtual events 144, 146, 148. In some examples, the first, second and/or third virtual events 144, 146, 148 change a physical responsiveness and/or flight characteristic of the first and/or second UAVs 102, 104 based on associated flight commands being executed if/when the UAVs 102, 104 come under the influence of the respective virtual events 144, 146, 148. In other words, based on a physical location of the UAV 102, 104 being within a threshold distance of the location of virtual event 144, 146, 148, a physical responsiveness and/or flight characteristic of the UAV 102, 104 may change based on an attribute of the virtual event 144, 146 and/or 148 and an associated flight command being executed.

To enable the virtual environment of the game (e.g., the first, second and/or third virtual events 144, 146, 18) in which the first UAV 102 is participating to be identified, in some examples, the processor 136 accesses the game data 121 from the game facilitator 119. In some examples, the game data 121 defines virtual obstacles, virtual topography, etc., such as, for example, virtual trees, virtual mountains, virtual hills, virtual caves, virtual valleys, etc. In some examples, the game data 121 defines virtual events including a virtual laser being fired by the second UAV 104, a virtual cloud, a virtual tractor beam being emitted by the second UAV 104, etc. In some examples, the game data 121 further includes location data including the location of the virtual event(s) 144, 146, 148 within the environment 110.

Once accessed, in some examples, the processor 136 and/or the game facilitator 119 generates and/or provides the virtual event(s) and/or associated data to the first remote controller 114 via, for example, the feedback 112 to affect the experience at the user level. In some examples, the feedback includes audio feedback, visual feedback, haptic feedback, etc. provided to the first remote controller 114 based on the event (e.g., the virtual event) occurring within the game and/or the competition.

In the illustrated example, to determine the relative positions between the first UAV 102 and one or more of the virtual events 144, 146, 18, the processor 136 accesses and/or determines location data associated with the first UAV 102, the second UAV 104 and the virtual events 144, 146, 148. In some examples, the location data is accessed from the game facilitator 119, the first UAV 102, the second UAV 104, the first remote controller 114 and/or the second remote controller 120. To determine if the first virtual event 144 affects the first UAV 102, the processor 136 compares the location of the first virtual event 144 and the location of the first UAV 102 to determine if the locations of the first virtual event 144 and the first UAV 102 are within a threshold distance of one another. If the locations are within a threshold distance of one another, the processor 136 may determine that the first virtual event 144 affects the first UAV 102. However, if the locations are not within the threshold distance of one another, the processor 136 may determine that the first virtual event 144 does not affect the first UAV 102.

In some such examples, one or more of the virtual events 144, 146, 148 can be implemented as an example virtual viscous area of the environment 110, an example virtual low visibility area of the environment 110, an example virtual attractive hole of the environment 110 and/or an example virtual acceleration zone of the environment 110. While some examples of ways the virtual events 144, 146, 148 can be implemented have been mentioned, any other example may be used depending on the game being played, etc.

In operation, when the processor 136 determines that the first UAV 102 is affected by the first virtual event 144 based on the relative locations of the first UAV 102 and the first virtual event 144 being within a threshold distance of one another, in some examples, an example game experience controller 150 of the first UAV 102 executes flight commands 152 accessed from the game data 121 to cause the first UAV 102 to simulate being affected by the first virtual event 144. In other words, when the processor 136 determines that the first UAV 102 is within and/or otherwise affected by the first virtual event 144, in this example, the example game experience controller 150 overrides, augments and/or changes the first commands 111 from the first remote controller 114 to be representative of flying through and/or being affected by the first virtual event 144. Thus, the flight commands 111, 116 accessed from the first and second controllers 114, 116 may be associated with a non-augmented state of the UAV 102, 104 and the flight commands 152 accessed from the data storage 142 may be associated with an augmented state of the UAV 102.

Additionally or alternatively, when the processor 136 determines that the first UAV 102 is affected by the first virtual event 144 based on the relative locations of the first UAV 102 and the first virtual event 144 being within the threshold distance of one another, the game experience controller 150 executes audio commands 154 and/or visual commands 156 that cause the first UAV 102 to appear to be affected by the first virtual event 144. The audio commands 154 and/or the visual commands 156 may be accessible from the game data 121 and are associated with an augmented state of the first UAV 102. In some examples, executing the visual commands 156 causes example audio effects 158 to emit sound to simulate the first UAV 102 accelerating and/or otherwise being affected by the first virtual event 144 when the actual speed and/or flight pattern of the first UAV 102 remains constant. In some examples, executing the visual commands 156 causes example visual effects 160 to emit light on the propellers 108 to simulate the first UAV 102 accelerating and/or otherwise being affected by the first virtual event 144 when the acceleration rate and/or the flight pattern of the first UAV 102 remains constant.

While the above examples mention the processor 136 and the game experience controller 150 being implemented in the first UAV 102, the processor 136, the game experience controller 150 and/or portions thereof may additionally or alternatively be implemented by the first remote controller 114. Such an approach of implementing the processor 136, the game experience controller 150 and/or portions thereof in the first remote controller 114 and/or otherwise external to the first UAV 102 may enable the first UAV 102 to be smaller, lighter and/or cheaper to manufacture, etc.

Figure 2:
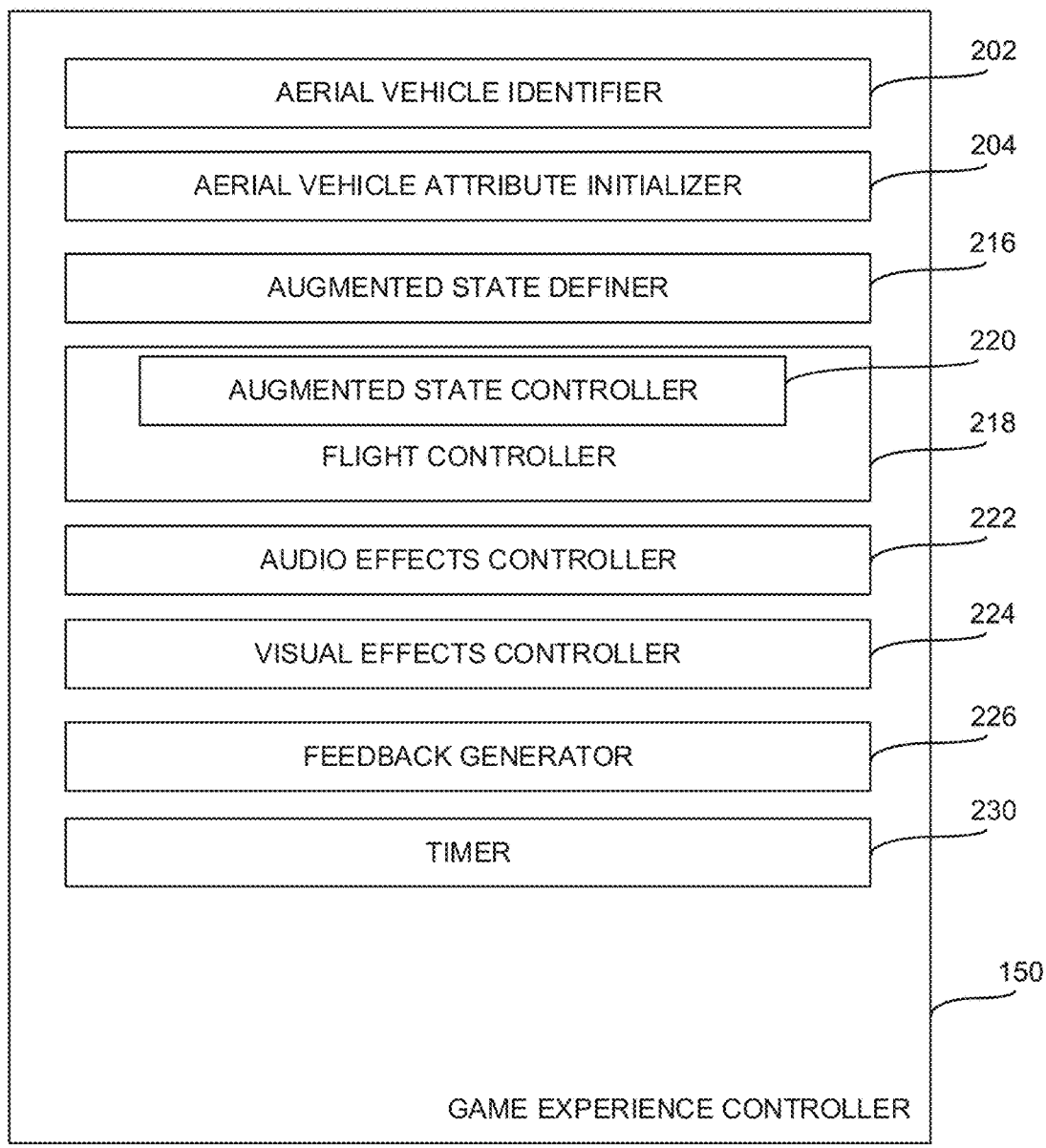
FIG. 2 is a block diagram of an example implementation of the example game experience controller of FIG. 1.

FIG. 2 illustrates an example implementation of the example game experience controller 150 of FIG. 1. In the illustrated example, the game experience controller 150 includes an example aerial vehicle identifier 202, an example aerial vehicle attribute initializer 204, an example augmented state definer 216, an example flight controller 218 including an example augmented state controller 220, an example audio effects controller 222, an example visual effects controller 224, an example feedback generator 226 and an example timer 230.

In the illustrated example, the aerial vehicle identifier 202 identifies attributes (e.g., characteristics and/or statistics) associated with the first UAV 102. In this example, the attributes (e.g., characteristics and/or statistics) are stored in the data storage 142 and/or the game data 121, and are identified prior to the first UAV 102 participating in a game and/or the event, and/or while the UAV 102 is participating in the game and/or event. In some examples, the attributes identified include speed attributes (e.g., minimum speed, maximum speed) of the first UAV 102, electronic speed controller (ESC) attributes, acceleration attributes (e.g., minimum acceleration, maximum acceleration) of the first UAV 102, agility attributes of the first UAV 102, a wireless range of the first UAV 102, a maximum flight time of the first UAV 102, battery attributes of the first UAV 102, etc.

To initialize the first UAV 102 to participate in the game and/or event, in some examples, the aerial vehicle attribute initializer 204 accesses the game data 121 from the data storage 142 and/or the game facilitator 119. In some examples, the game data 121 defines attributes that the first UAV 102 is to have and/or exhibit when participating in the game and/or the event. In some examples, the attributes defined in the game data 121 are the same as the attributes identified by the aerial vehicle identifier 202. In other examples, the attributes defined in the game data 121 are different than the attributes identified by the aerial vehicle identifier 202. For example, the attributes defined in the game data 121 may define a maximum speed for the first UAV 102 when the first UAV 102 participates in the game and/or event as being less than the maximum speed identified by the aerial vehicle identifier 202. The attributes may include the maximum speed of the first UAV 102, an agility level of the first UAV 102, etc. Once accessed, the aerial vehicle attribute initializer 204 assigns those attributes to the first UAV 102 prior to the start of the game and/or the event and/or during the game and/or event itself.

During a game and/or a competition, if the processor 136 determines that a virtual event (e.g., the virtual event 144) and the first UAV 102 are within a threshold distance of one another, the augmented state definer 216 defines an augmented state for the first UAV 102 based on, for example, the game data 121 accessed from the game facilitator 119. For example, if the first virtual event 144 is a virtual tractor beam emitted by the second UAV 104 and the processor 136 determines that the first UAV 104 is within a threshold distance of the tractor beam, the augmented state definer 216 defines the first UAV 102 as being affected by the virtual tractor beam based on the definition(s) included in the game data 121. As such, to simulate the first UAV 102 being affected by the virtual tractor beam, in some examples, the augmented state controller 220 accesses and executes the flight commands 152 that change and/or augment flight characteristics of the first UAV 102 in a manner that is different than the flight commands 111 received from the first remote controller 114. However, if the processor 136 determines that the first virtual event 144 and the first UAV 102 are not within a threshold of one another, the augmented state definer 216 determines that the first UAV 102 is not affected by the tractor beam and, thus, does not define an augmented state for the first UAV 102. When the first UAV 102 is not affected by the virtual event and, thus, is not in an augmented state, the flight controller 222 and/or the processor 136 may control the first UAV 102 based on the first flight commands 111 received from the first remote controller 114.

In some examples, if the virtual event is a laser emitted by the second UAV 104 and the processor 136 determines that the first UAV 104 is within a threshold distance of the laser (e.g., the event), the augmented state definer 216 defines the first UAV 102 as being affected by the laser based on a definition(s) within the game data 121. In some such examples, when the augmented state definer 216 determines that the first UAV 102 is virtually damaged and/or affected by the virtual event(s), the augmented state controller 220 accesses and executes the flight commands 152 that change and/or augment flight characteristics of the first UAV 102 in a manner that is different than the flight commands 111 received from the first remote controller 114. For example, in response to determining that the first UAV 102 is being affected by a laser virtual event, the augmented state controller 220 may execute the flight commands 152 that cause the first UAV 102 to perform a controlled graveyard spiral and/or roll. In some examples, the flight commands executed by the augmented state controller 220 are configured and/or structured to ensure that that the first UAV 102 is not physically damaged when performing these maneuvers and/or when the first UAV 102 is being autonomously and/or semi-autonomously controlled.

Additionally or alternatively, during a game and/or a competition, in some such examples, when the processor 136 determines that the first UAV 102 is virtually damaged and/or affected by a virtual event(s), the audio effects controller 222 accesses and executes the audio commands 154 that cause the audio effects 158 to emit sound that simulates the first UAV 102 being damaged and/or otherwise being affected by a virtual event(s). Additionally or alternatively, in some such examples, when the processor 136 determines that the first UAV 102 is virtually damaged and/or affected by a virtual event(s), the visual effects controller 224 accesses and executes the visual commands 156 that cause the visual effects 160 to emit light and/or other effects that simulate the first UAV 102 being damaged and/or otherwise being affected by a virtual event(s).

Additionally or alternatively, during a game and/or a competition, in some such examples, when the processor 136 determines that the first UAV 102 is virtually damaged and/or affected by a virtual event(s), the feedback generator 226 generates the feedback 112 associated with the virtual event(s). For example, the feedback generator 226 may generate visual feedback, audio feedback, haptic feedback, etc., to affect and/or enhance a user's experience at the remote controller (e.g., the first remote controller 114). In some examples, the feedback 112 is accessed from the game data 121.

In the illustrated example, when the first UAV 102 is controlled by the augmented state controller 220, the timer 230 determines when a threshold amount of time has lapsed to enable the first UAV 102 to again be controlled by the flight commands 111 (e.g., without any virtual augmentation). When the threshold amount of time has lapsed, the flight controller 218 accesses the first flight commands 111 to control the first UAV 102 in the non-augmented state.

While an example manner of implementing the game experience controller 150 of FIG. 1 is illustrated in FIG. 2, one or more of the elements, processes and/or devices illustrated in FIG. 2 may be combined, divided, re-arranged, omitted, eliminated and/or implemented in any other way. Further, the example aerial vehicle identifier 202, the example aerial vehicle attribute initializer 204, the example augmented state definer 216, the example flight controller 218, the example augmented state controller 220, the example audio effects controller 222, the example visual effects controller 224, the example feedback generator 226, the example timer 230 and/or, more generally, the example game experience controller 150 of FIG. 2 may be implemented by hardware, software, firmware and/or any combination of hardware, software and/or firmware. Thus, for example, any of the example aerial vehicle identifier 202, the example aerial vehicle attribute initializer 204, the example augmented state definer 216, the example flight controller 218, the example augmented state controller 220, the example audio effects controller 222, the example visual effects controller 224, the example feedback generator 226, the example timer 230 and/or, more generally, the example game experience controller 150 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example aerial vehicle identifier 202, the example aerial vehicle attribute initializer 204, the example augmented state definer 216, the example flight controller 218, the example augmented state controller 220, the example audio effects controller 222, the example visual effects controller 224, the example feedback generator 226, the example timer 230 and/or, more generally, the example game experience controller 150 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example game experience controller 150 of FIG. 1 may include one or more elements, processes and/or devices in addition to, or instead of, those illustrated in FIG. 2, and/or may include more than one of any or all of the illustrated elements, processes and devices.

Figure 3:
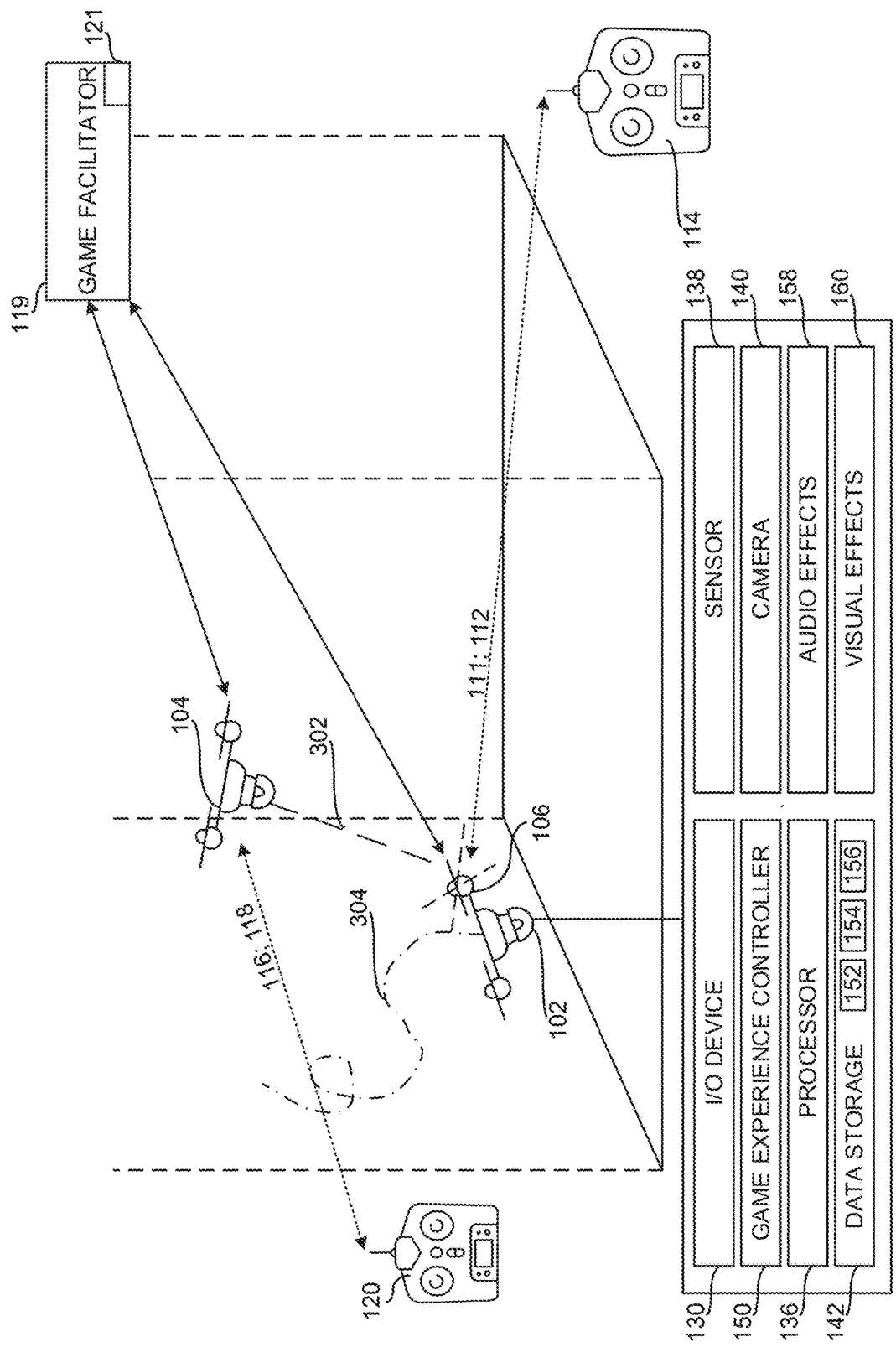
FIG. 3 is a schematic illustration of a first example unmanned aerial vehicle being affected by a virtual propeller disabling ray emitted by a second example unmanned aerial vehicle in accordance with the teachings of this disclosure.

FIG. 3 illustrates an example operational scenario involving the second UAV 104 firing an example virtual propeller disabling ray 302 at the first UAV 102 based on the appropriate flight command(s) 116 received from the second remote controller 120. To determine if the first UAV 102 is affected by a virtual event corresponding to the virtual ray 302, in some examples, the processor 136 compares a location of the virtual ray 302 and a location of the first UAV 102 to determine if the virtual ray 302 and the first UAV 102 are within a threshold distance of one another. In some examples, the location of the virtual ray 302 is determined by accessing the game data 121 and/or otherwise interacting with the game facilitator 119 and/or the UAV 102, 104. As shown in the example of FIG. 3, based on the processor 136 identifying the virtual ray 302 and the first UAV 102 being within a threshold distance of one another, the game experience controller 150 executes the flight commands 152 associated with the virtual ray 302. In this example, executing the flight commands 152 cause a corresponding change in a flight pattern 304 of the first UAV 102 for a threshold period of time to simulate the first UAV 102 being damaged. Additionally or alternatively, the game experience controller 150 generates the feedback 112 at the first remote controller 114 to simulate the first UAV 102 being damaged by the virtual ray 202.

In some examples, while the flight pattern 304 of the first UAV 102 is affected by the virtual ray 302, the game experience controller 150 executes the audio commands 154 and/or executes the visual commands 156 that cause the visual effects 160 and/or the audio effects 158 to emit light and/or sound to further simulate the first UAV 102 being damaged by the virtual ray 302. Additionally and/or alternatively, in some examples, a second game experience controller 150 of the second UAV 104 causes second visual effects and/or second audio effects of the second UAV 104 to emit light and/or sound to simulate the virtual ray 302 being fired.

Figure 4:
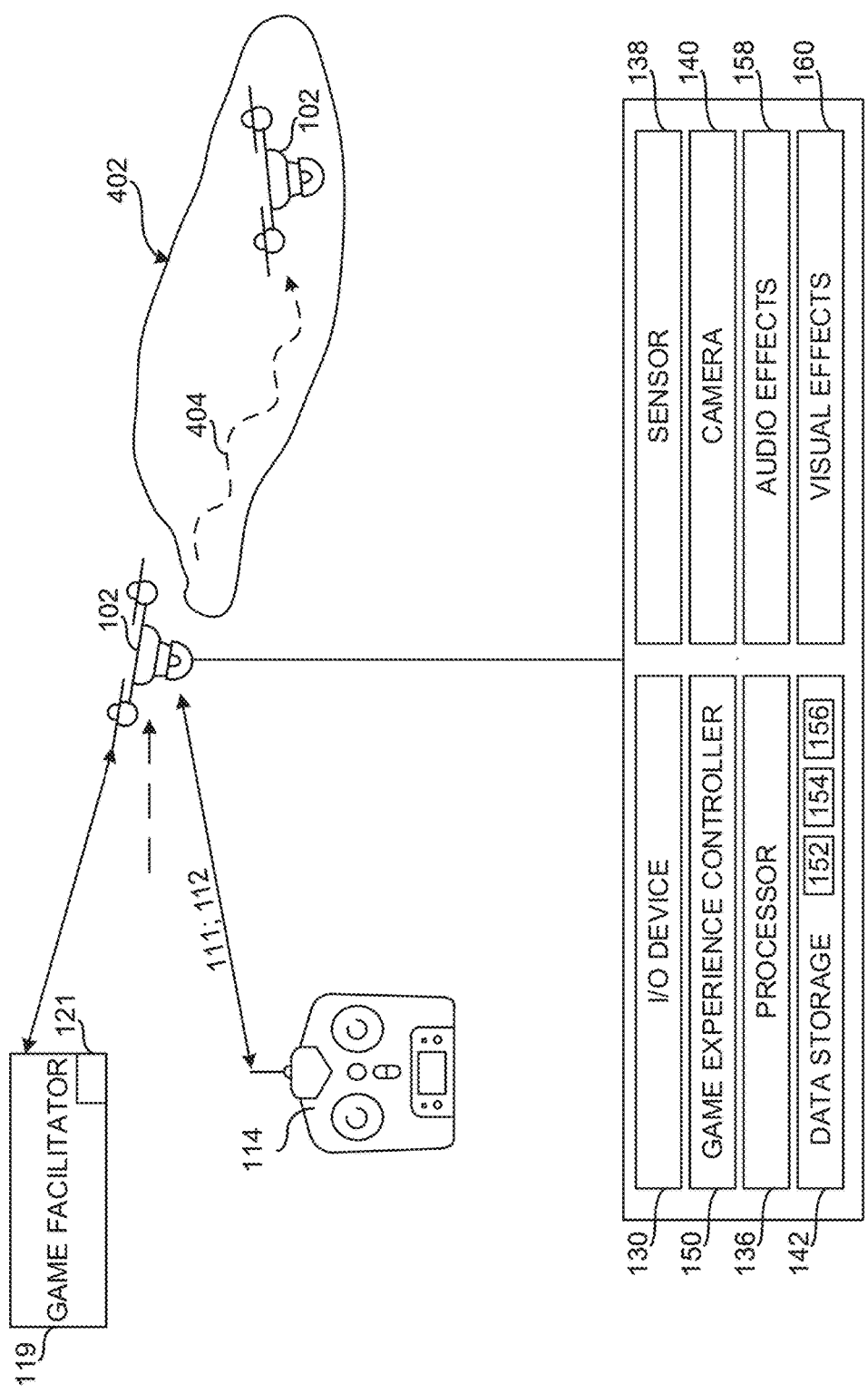
FIG. 4 is a schematic illustration of an example unmanned aerial vehicle being affected by a virtual viscous area in accordance with the teachings of this disclosure.

FIG. 4 illustrates an example operational scenario involving of the first UAV 102 flying through an example virtual viscous area 402. To determine if the first UAV 102 is affected by a virtual event corresponding to the virtual viscous area 402 and/or flying through the virtual viscous area 402, in some examples, the processor 136 compares a location of the virtual viscous area 402 and a location of the first UAV 102 to determine if the virtual viscous area 402 and the first UAV 102 are within a threshold distance of one another. In some examples, the location of the virtual viscous area 402 is determined by accessing the game data 121 and/or otherwise interacting with the game facilitator 119 and/or the UAV 102, 104.

As shown in the example of FIG. 4, based on the processor 136 identifying the virtual viscous area 402 and the first UAV 102 being within a threshold distance of one another, the game experience controller 150 executes the appropriate flight commands 152 associated with the virtual viscous area 402 to change a flight pattern 404 of the first UAV 102, and/or generates the feedback 112 at the first remote controller 114, to simulate the first UAV 102 being less visible or not visible at the first remote controller 114. Additionally or alternatively, in some examples, the game experience controller 150 and/or the game facilitator 119 communicates with a second game experience controller 150 of the second UAV 104 to cause the first UAV 102 to be less visible or not visible at the second remote controller 120, via the feedback 118, when the first UAV 102 flies through and/or is within the virtual viscous area 502.

Figure 5:
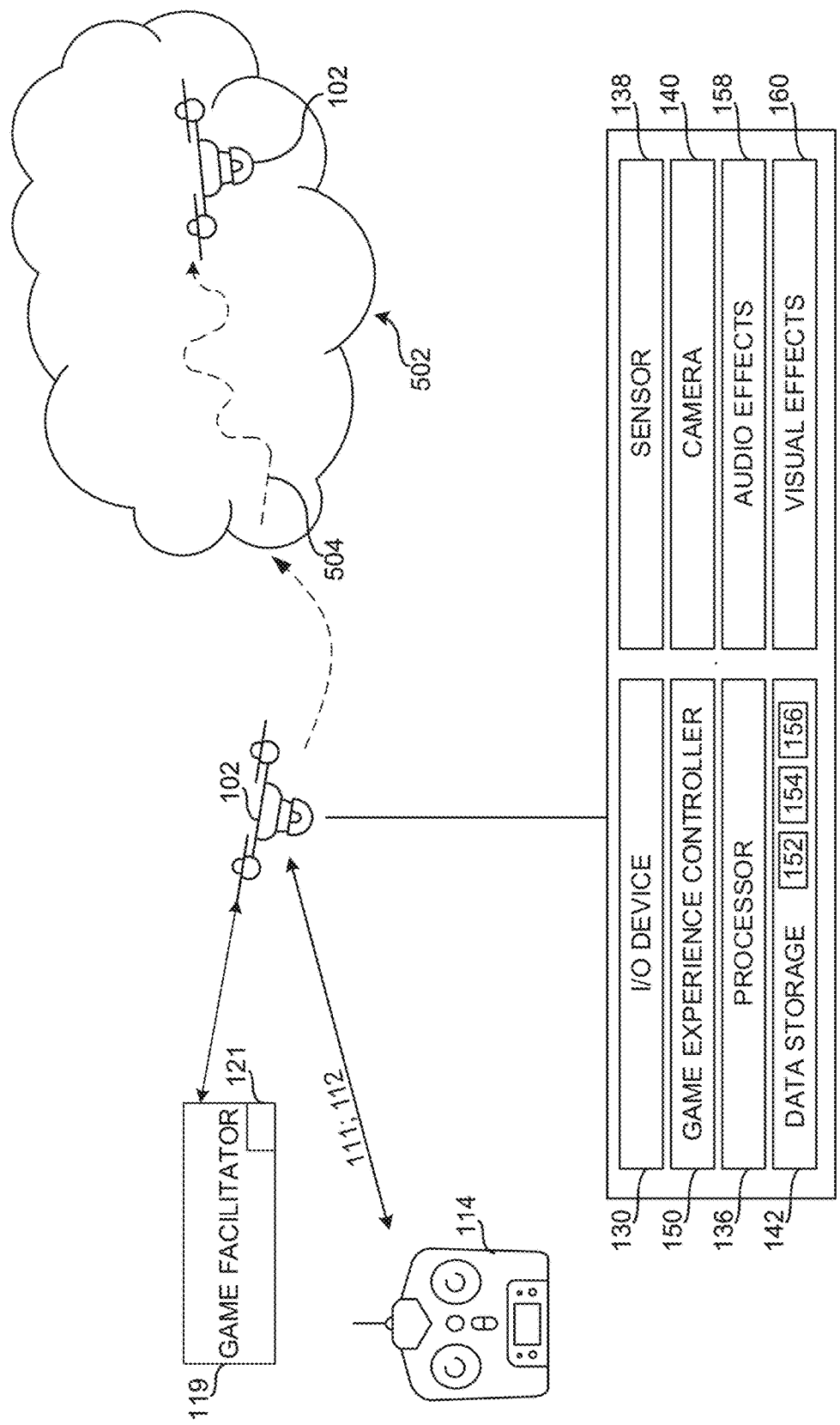
FIG. 5 is a schematic illustration of an example unmanned aerial vehicle being affected by virtual smoke in accordance with the teachings of this disclosure.

FIG. 5 illustrates an example operational scenario involving the first UAV 102 flying through example virtual smoke 502. In some examples, to determine if the first UAV 102 is affected by a virtual event corresponding to the virtual smoke 502 and/or flying through the virtual smoke 502, in some examples, the game experience controller 150 compares a location of the virtual smoke 502 and a location of the first UAV 102 to determine if the virtual smoke 502 and the first UAV 102 are within a threshold distance of one another.

As shown in the example of FIG. 5, based on the processor 136 identifying the virtual smoke 502 and the first UAV 102 being within a threshold distance of one another, the game experience controller 150 executes the appropriate flight commands 152 associated with the virtual smoke 502 that causes a flight pattern 504 of the first UAV 102 to change. Additionally or alternatively, the game experience controller 150 and/or the game facilitator 119 generates the appropriate feedback 112 at the first remote controller 114 to simulate the first UAV 102 being less visible or not visible at the first remote controller 114. Additionally or alternatively, in some examples, the game experience controller 150 communicates with a second game experience controller 150 of the second UAV 104 to cause the first UAV 102 to be less visible or not visible at the second remote controller 120, via the feedback 118, when the first UAV 102 flies through and/or is within the virtual smoke 502.

FIG. 6 illustrates an example operational scenario involving the first UAV 102 flying adjacent to a virtual attractive hole 602. To determine if the first UAV 102 is affected by a virtual event corresponding to the virtual attractive hole 602, in some examples, the processor 136 compares a location of the virtual attractive hole 602 and a location of the first UAV 102 to determine if the virtual attractive hole 602 and the first UAV 102 are within a threshold distance of one another. In some examples, the location of the virtual attractive hole 602 is determined by accessing the game data 121 and/or otherwise interacting with the game facilitator 119 and/or the UAV 102, 104.

As shown in the example of FIG. 6, based on the processor 136 identifying the virtual attractive hole 502 and the first UAV 102 being within a threshold distance of one another, the game experience controller 150 executes the appropriate flight commands 152 associated with the virtual attractive hole 602 to change the flight pattern 604 of the first UAV 102 to bend toward the virtual attractive hole 602. Additionally or alternatively, in some examples, the game experience controller 150 and/or the game facilitator 119 generates the appropriate feedback 112 at the first remote controller 114 to simulate the first UAV 102 being drawn toward the virtual attractive hole 602. In other words, in this example, the game experience controller 150 augments the flight commands 111 received from the first remote controller 114 to account for the virtual attractive hole 602 affecting the first UAV 102 and/or instead executes the augmented flight commands 152 associated with the virtual attractive hole 602. In some examples, the game experience controller 150 causes the flight pattern 604 of the first UAV 102 to be affected by the virtual attractive hole 602 for a threshold amount of time (e.g., 2 seconds, 5 seconds, 20 seconds, etc.) prior to again controlling the first UAV 102 using the flight commands 111.

Figure 7:
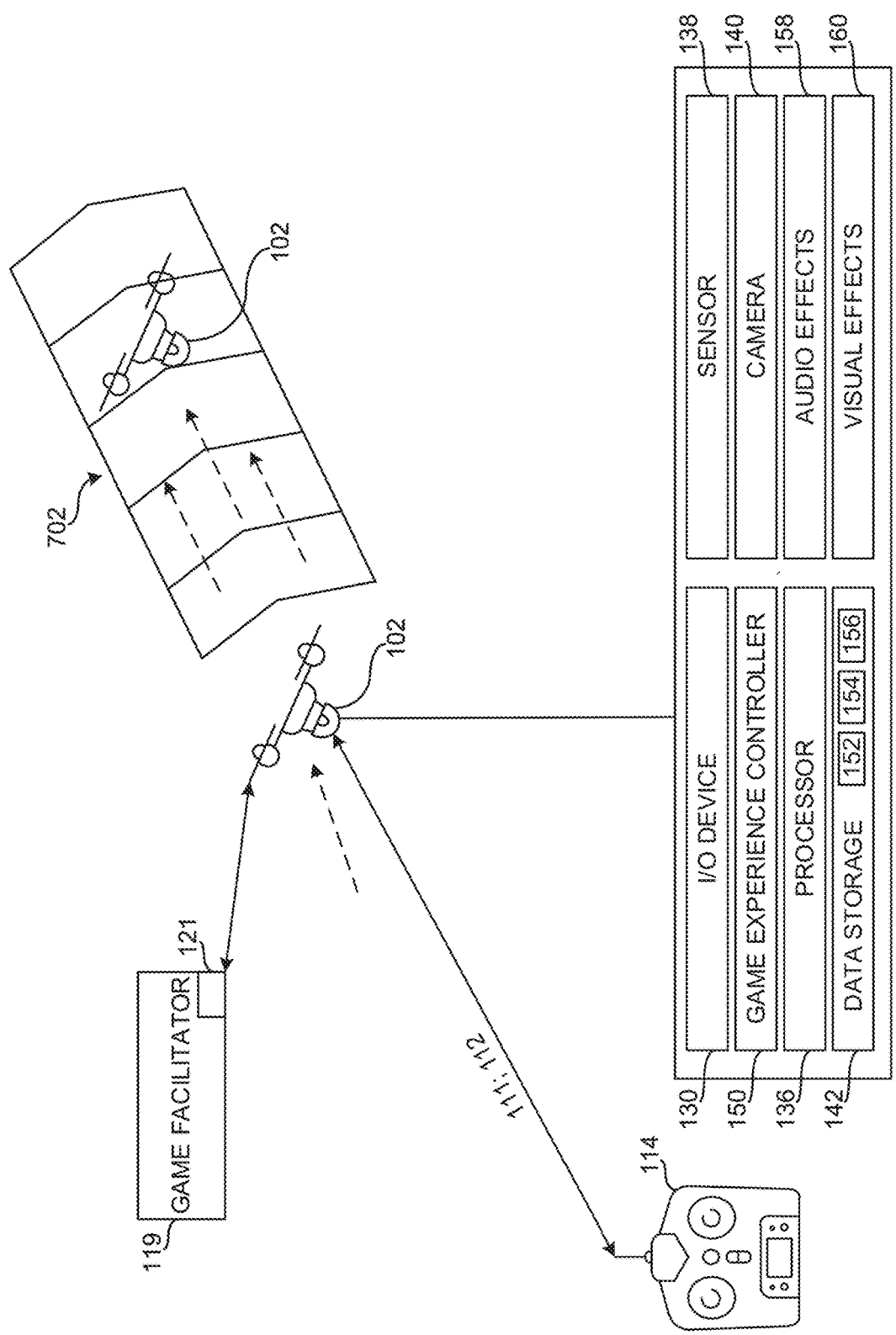
FIG. 7 is a schematic illustration of an example unmanned aerial vehicle being affected by a virtual boost or acceleration track in accordance with the teachings of this disclosure.

FIG. 7 illustrates an example operational scenario involving the first UAV 102 flying adjacent to an example acceleration and/or boost track 702. In some examples, to determine if the first UAV 102 is affected by a virtual event corresponding to the acceleration track 702, in some examples, the processor 136 compares a location of the acceleration track 702 and a location of the first UAV 102 to determine if the acceleration track 702 and the first UAV 102 are within a threshold distance of one another. In some examples, the location of the acceleration track 702 is determined by accessing the game data 121 and/or otherwise interacting with the game facilitator 119 and/or the UAV 102, 104.

As shown in the example of FIG. 7, based on the processor 136 identifying the acceleration track 702 and the first UAV 102 being within a threshold distance of one another, the game experience controller 150 executes the appropriate flight commands 152 associated with the acceleration track 702 to cause the first UAV 102 to accelerate and/or virtually accelerate for a threshold period of time. In some examples, while the first UAV 102 is affected by the acceleration track 702, the game experience controller 150 executes the appropriate audio commands 154 and/or the appropriate visual commands 156 that cause the visual effects 160 and/or the audio effects 158 to emit light and/or sound to further simulate the first UAV 102 accelerating. Thus, in some such examples, the actual speed of the first UAV 102 may not change when the first UAV 102 is affected by the acceleration track 702 but instead the visual effects 160 and/or the audio effects 158 simulate acceleration. Additionally or alternatively, in some examples, the game experience controller 150 and/or the game facilitator 119 generates the appropriate feedback 112 at the first remote controller 114 to cause the simulation of acceleration to occur.

Figure 8:
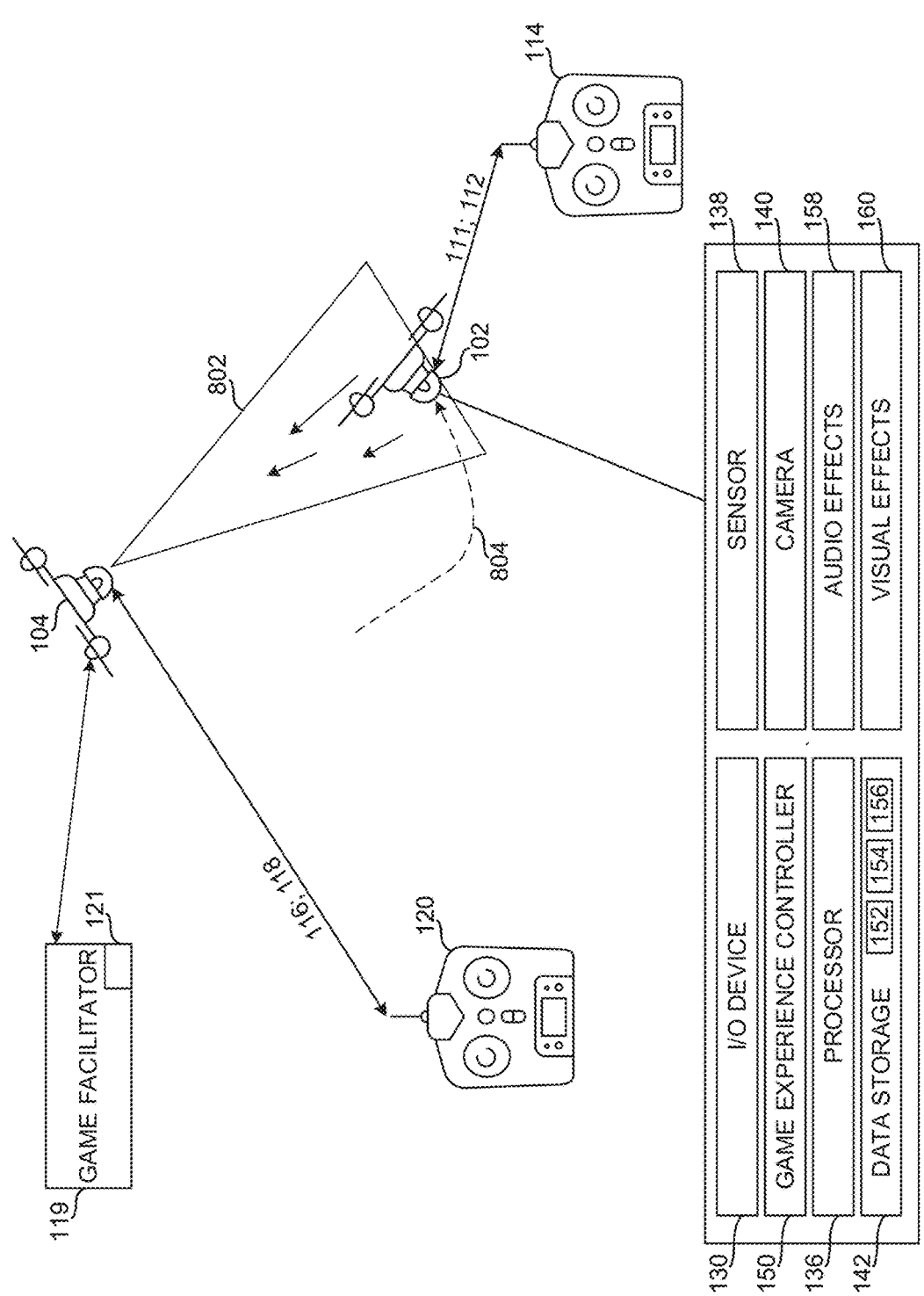
FIG. 8 is a schematic illustration of a first example unmanned aerial vehicle being affected by a virtual tractor beam emitted by a second example unmanned aerial vehicle in accordance with the teachings of this disclosure.

FIG. 8 illustrates an example operational scenario involving the second UAV 104 firing an example virtual tractor beam 802 at the first UAV 102 based on the flight command 116 received from the second remote controller 120. To determine if the first UAV 102 is affected by a virtual event corresponding to the virtual tractor beam 802, in some examples, the processor 136 compares a location of the virtual tractor beam 802 and a location of the first UAV 102 to determine if the virtual tractor beam 802 and the first UAV 102 are within a threshold distance of one another. In some examples, the location of the virtual tractor beam 802 is determined by accessing the game data 121 and/or otherwise interacting with the game facilitator 119 and/or the UAV 102, 104.

As shown in the example of FIG. 8, based on the processor 136 identifying the virtual tractor beam 802 and the first UAV 102 being within a threshold distance of one another, the game experience controller 150 executes the appropriate flight commands 152 associated with the virtual tractor beam 802 to change a flight pattern 804 of the first UAV 102 for a threshold period of time. In some examples, while the flight pattern 804 of the first UAV 102 is affected by the virtual ray 302, the game experience controller 150 executes the appropriate audio commands 154 and/or the appropriate visual commands 156 associated with the virtual tractor beam 802 that cause the visual effects 160 and/or the audio effects 158 to emit light and/or sound to further simulate the first UAV 102 being drawn toward the second UAV 104 by the virtual tractor beam 802. In other words, the game experience controller 150 augments the flight commands 111 received from the first remote controller 114 to account for the virtual tractor beam 802 affecting the first UAV 102 and/or instead executes the augmented flight commands 152 associated with the virtual tractor beam 802. Additionally and/or alternatively, in some examples, a second game controller 150 of the second UAV 104 and/or the game facilitator 119 causes second visual effects and/or second audio effects of the second UAV 104 to emit light and/or sound to simulate the virtual tractor beam 802 being fired.

Figure 9:
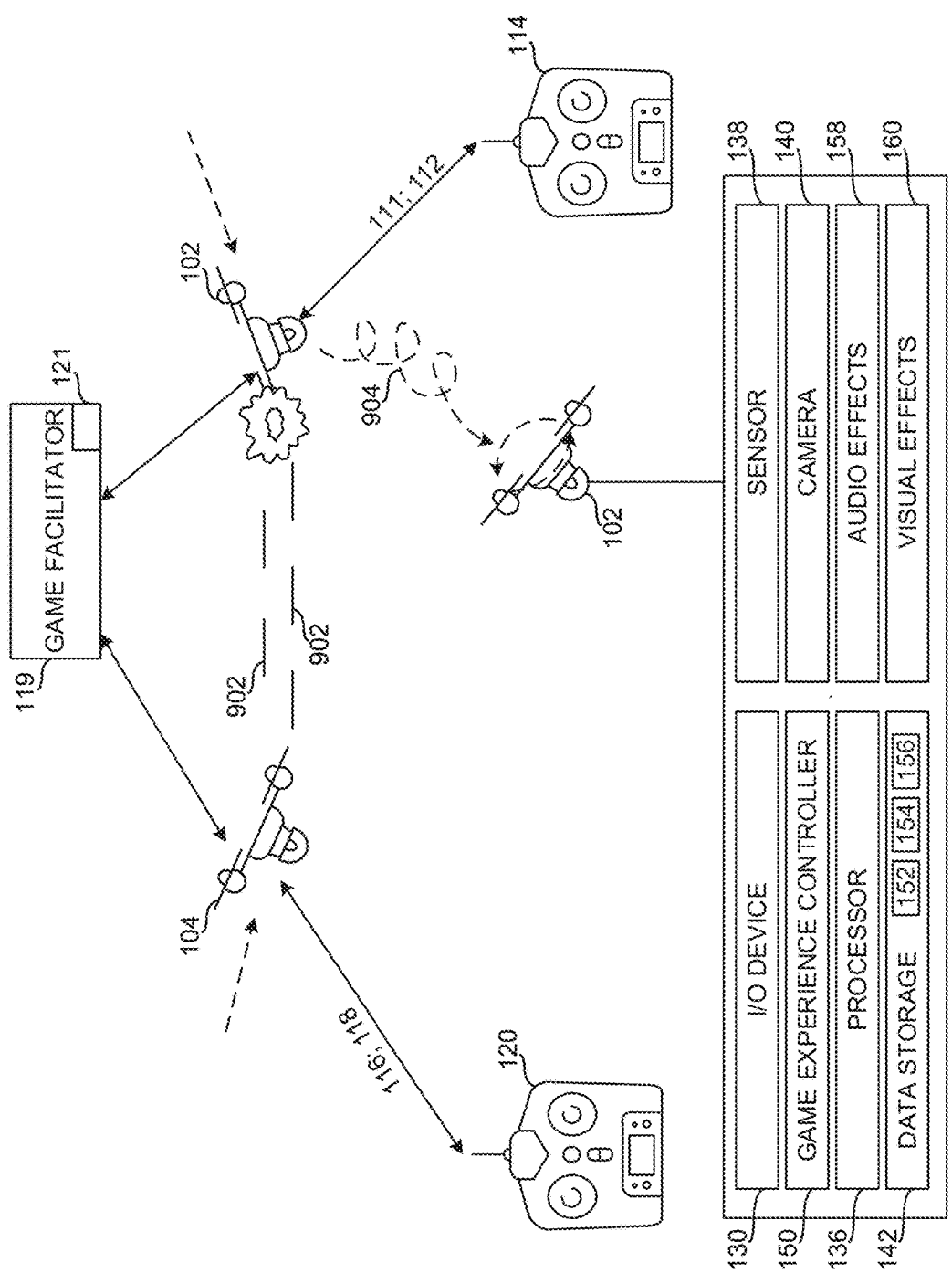
FIG. 9 is a schematic illustration of a first example unmanned aerial vehicle being affected by virtual bullets emitted by a second example unmanned aerial vehicle in accordance with the teachings of this disclosure.

FIG. 9 illustrates an example operational scenario involving the second UAV 104 firing virtual bullets 902 at the first UAV 102 based on the flight command 116 received from the second remote controller 120. As shown in the example of FIG. 9, based on the processor 136 determining that one or more of the virtual bullets 902 impact the first UAV 102, the game experience controller 150 executes the appropriate flight commands 152 that cause a flight pattern 904 of the first UAV 102 to change to simulate the first UAV 102 being damaged. As shown in the example of FIG. 9, the flight pattern 904 includes a controlled spin, a controlled graveyard spiral and/or graveyard spin, etc. However, the flight pattern 904 simulating the first UAV 102 being affected by the virtual bullets 902 and/or any other virtual event and/or environment may be different based on the game being played, etc.

Figure 10:
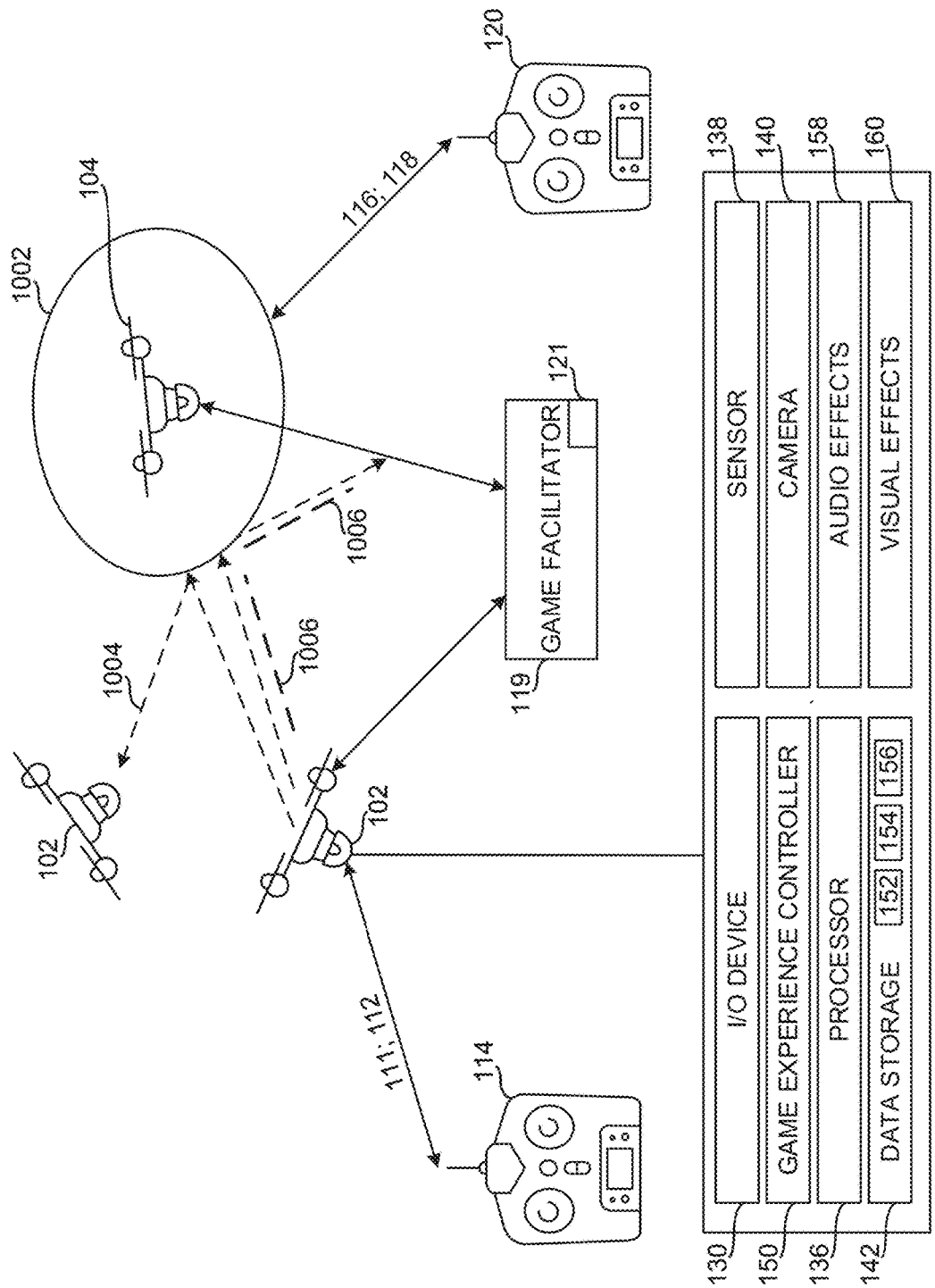
FIG. 10 is a schematic illustration of a first example unmanned aerial vehicle being affected by a virtual power shield emitted by a second example unmanned aerial vehicle in accordance with the teachings of this disclosure.

FIG. 10 illustrates an example operational scenario involving the second UAV 104 emitting a virtual power shield 1002 based on the flight command 116 received from the second remote controller 120. As shown in the example of FIG. 10, based on the processor 136 determining that the power shield 1002 effects the first UAV 102, the game experience controller 150 executes the appropriate flight commands 152 that cause a flight pattern 1004 of the first UAV 102 to change to simulate the first UAV 102 being deflected by the virtual power shield 1002 and for virtual bullets 1006 dfired by the first UAV 102 to be deflected by the virtual power shield 1002. In some examples, the flight pattern of the first UAV 102 changes when the virtual bullets 1006 are fired. Additionally or alternatively, in some examples, the audio effects controller 222 executes the appropriate audio commands 154 and/or the appropriate visual commands 156 associated with the first UAV 102 firing the virtual bullets 1006.

Figure 11:
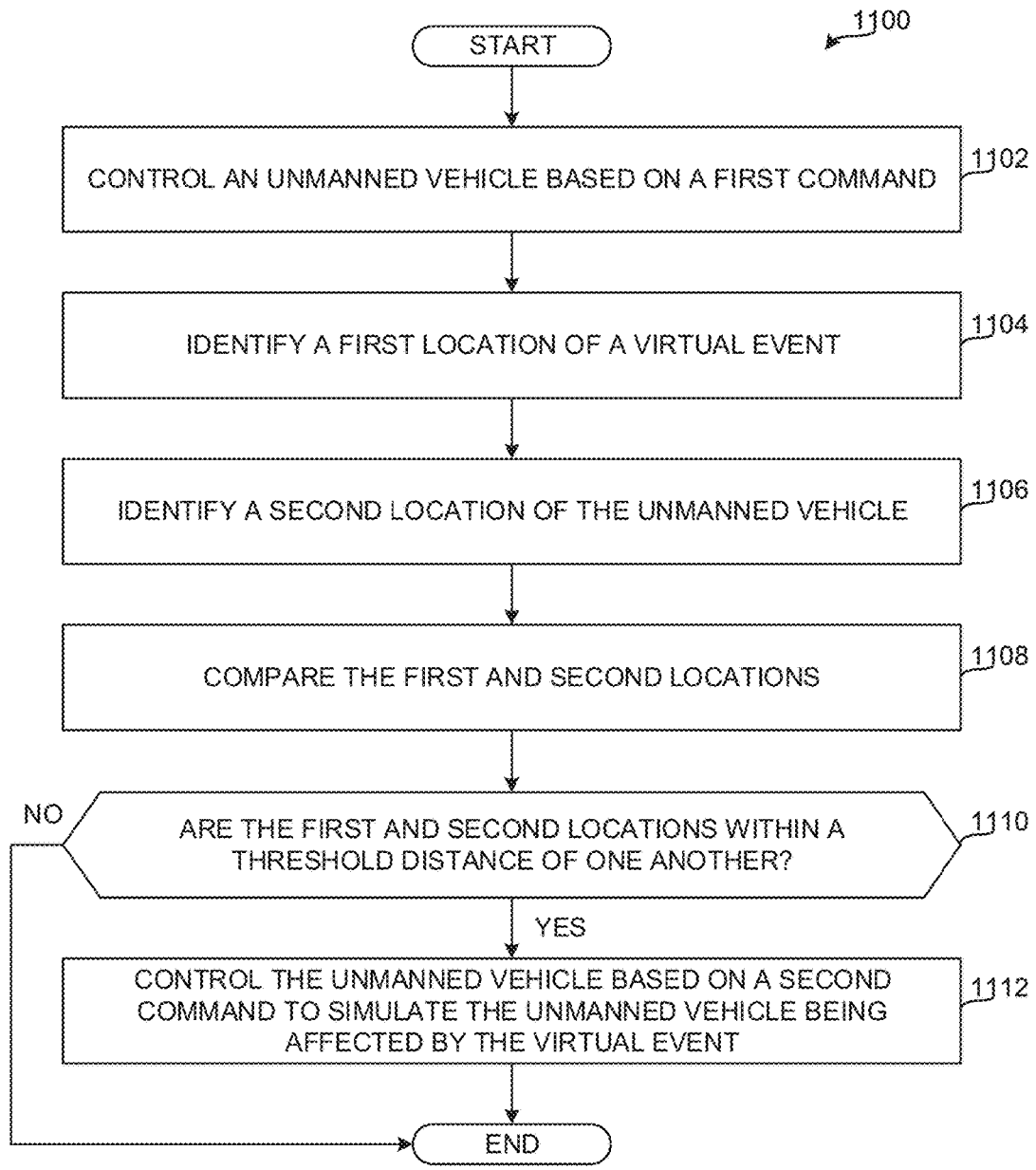
FIG. 11 is a flowchart representative of first machine readable instructions that may be executed to implement the game experience controller of FIGS. 1 and/or 2.
Figure 12:
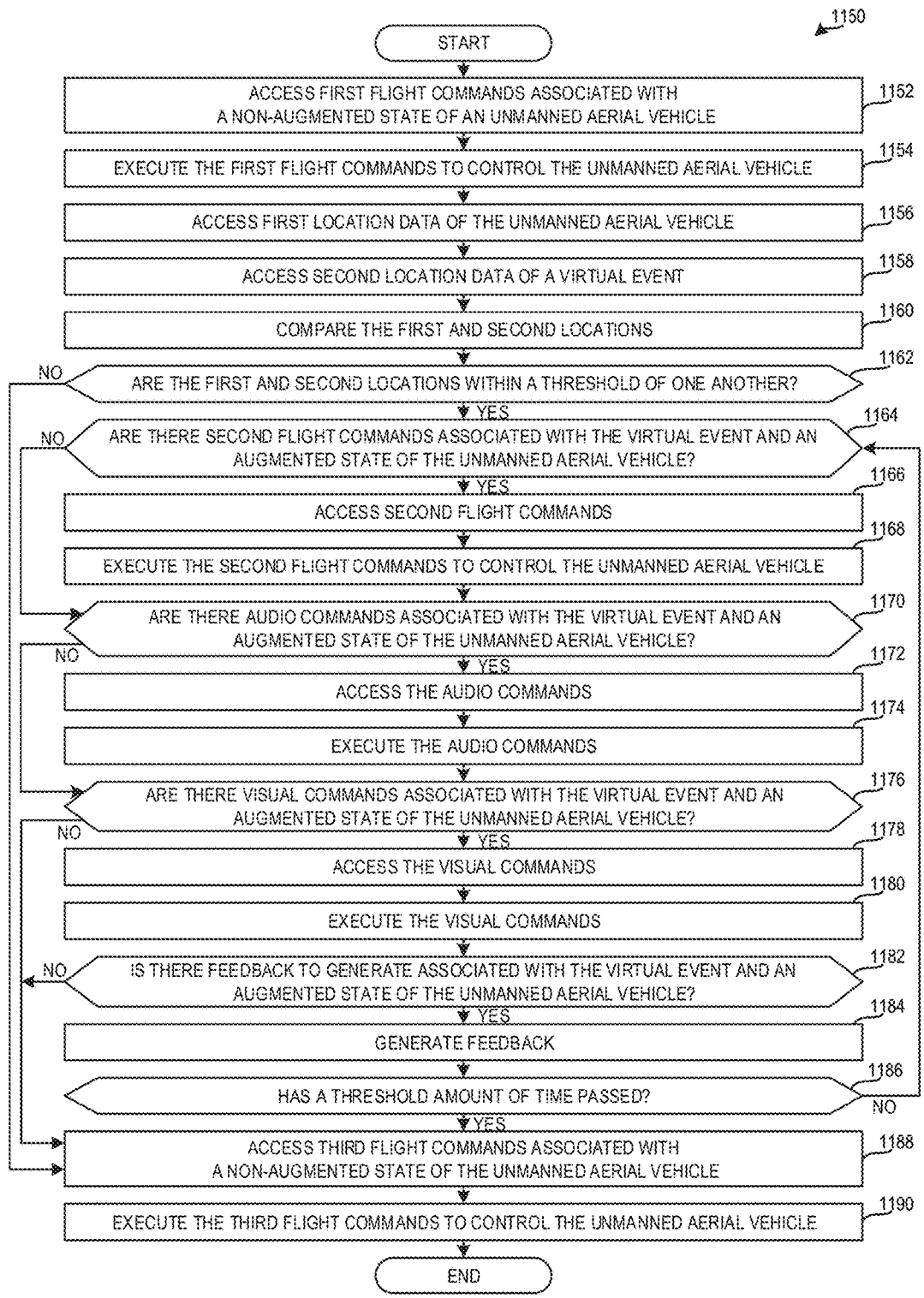
FIG. 12 is a flowchart representative of second machine readable instructions that may be executed to implement the game experience controller of FIGS. 1 and/or 2.

A flowchart representative of example machine readable instructions for implementing the game experience controller 150 of FIG. 2 is shown in FIGS. 11 and 12. In this example, the machine readable instructions comprise a program for execution by a processor such as the processor 1212 shown in the example processor platform 1200 discussed below in connection with FIG. 13. The program may be embodied in software stored on a non-transitory computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIGS. 11 and 12, many other methods of implementing the example game experience controller 150 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 11 and 12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The example program 1100 of FIG. 11 begins at block 1102 with the processor 136 executing the flight commands 111 to control an unmanned vehicle (e.g., the first UAV 102) (block 1102). The processor 136 identifies a first location of a first virtual event (e.g., the first virtual event 144) (block 1104) and identifies a second location of the unmanned vehicle (block 1106). The processor 136 compares the first and second locations (block 1108). At block 1110, the processor 136 determines if the first and second locations are within a threshold distance of one another (block 1110). If the first and second locations are within the threshold distance of one another, the augmented state controller 220 accesses and executes second flight commands to control the unmanned vehicle in a manner to simulate the unmanned vehicle being affected by the virtual event (block 1112).

The example program 1150 of FIG. 12 begins at block 1152 with the processor 136 accessing the flight commands 111 associated with a non-augmented state of the first UAV (block 1152). The processor 136 executes the flight commands 111 to control the first UAV 102 (block 1154). In some examples, the flight commands 111 are accessed and/or otherwise received from the first remote controller 114. The first remote controller 114 may receive input from a user (e.g., a person). Alternatively, the first remote controller 114 may autonomously and/or semi-autonomously generate and/or access the flight commands 111 to control the first UAV 102.

The processor 136 accesses first location data of the first UAV 102 (block 1156) and assesses second location data of the first virtual event 144 (block 1158). In some examples, the first location data is determined based on processing first, second and/or third position data 131, 132, 134 from the respective boundary beacons 122, 124, 126, and/or based on processing sensor and/or image/video data from the sensor 138 and/or the camera 140. Of course, the position of the first UAV 102 may be determined in many different ways. In some examples, the position of the first virtual event 144 is determined by the processor 136 by accessing the game data 121 at the game facilitator 119 and/or interacting with the first UAV 102, the first remote controller 114, the second UAV 104 and/or the second remote controller 120.

The processor 136 compares the first and second locations (block 1160). At block 1112, the processor 136 determines if the first and second locations are within a threshold distance of one another (block 1162). If the first and second locations are within the threshold distance of one another, the augmented state definer 216 determines if there are second flight commands associated with the first virtual event 144 and an augmented state of the first UAV 102 (block 1164). In some examples, the second flight commands, if available, are associated with the flight commands 152 and/or the game data 121. In some examples, the second flight commands are associated with the first UAV 102 simulating being under the influence of a virtual force and/or otherwise being affected by a virtual force and/or a virtual flying condition. If the augmented state definer 216 identifies the presence of the second flight commands, the augmented state controller 220 accesses the second flight commands (block 1166) and executes the second flight commands to control the first UAV 102 (block 1168).

At block 1170, the augmented state definer 216 determines if there are audio commands associated with the first virtual event 144 and the augmented state of the first UAV 102. In some examples, the audio commands, if available, are associated with the audio commands 154 and/or the game data 121. In some examples, the audio commands are associated with the first UAV 102 simulating being under the influence of a virtual force and/or otherwise being affected by a virtual force and/or a virtual flying condition. If the augmented state definer 216 identifies the presence of the audio commands, the augmented state controller 220 accesses the audio commands (block 1172) and executes the audio commands that cause the audio effects 158 to emit noise/sound, etc., associated with the first virtual event 144 (block 1174).

At block 1176, the augmented state definer 216 determines if there are visual commands associated with the first virtual event 144 and the augmented state of the first UAV 102. In some examples, the visual commands, if available, are associated with the visual commands 156 and/or the game data 121. In some examples, the visual commands are associated with the first UAV 102 simulating being under the influence of a virtual force and/or otherwise being affected by a virtual force and/or a virtual flying condition. If the augmented state definer 216 identifies the presence of the second flight commands, the augmented state controller 220 accesses the visual commands (block 1178) and executes the visual commands that cause the visual effects 160 to emit light, etc., associated with the first virtual event 144 (block 1180).

At block 1182, the augmented state definer 216 determines if there is feedback to generate associated with the first virtual event 144 and the augmented state of the first UAV 102 (block 1182). If the augmented state definer 216 determines there is feedback to generate associated with the virtual event, the feedback generator 226 generates the feedback 112 (block 1184). In some examples, the feedback 112 is associated with audio feedback, visual feedback, haptic feedback, etc.

While the second flight commands, the audio commands, the visual commands, etc., are being executed and/or while the feedback is being generated, the timer 230 determines whether a threshold amount of time has lapsed (block 1186). If the threshold amount of time has lapsed, the flight controller 118 accesses the flight commands 111 associated with the non-augmented state of the first UAV 102 (block 1188) and executes the flight commands 111 to control the first UAV 102 (block 1190).

Figure 13:
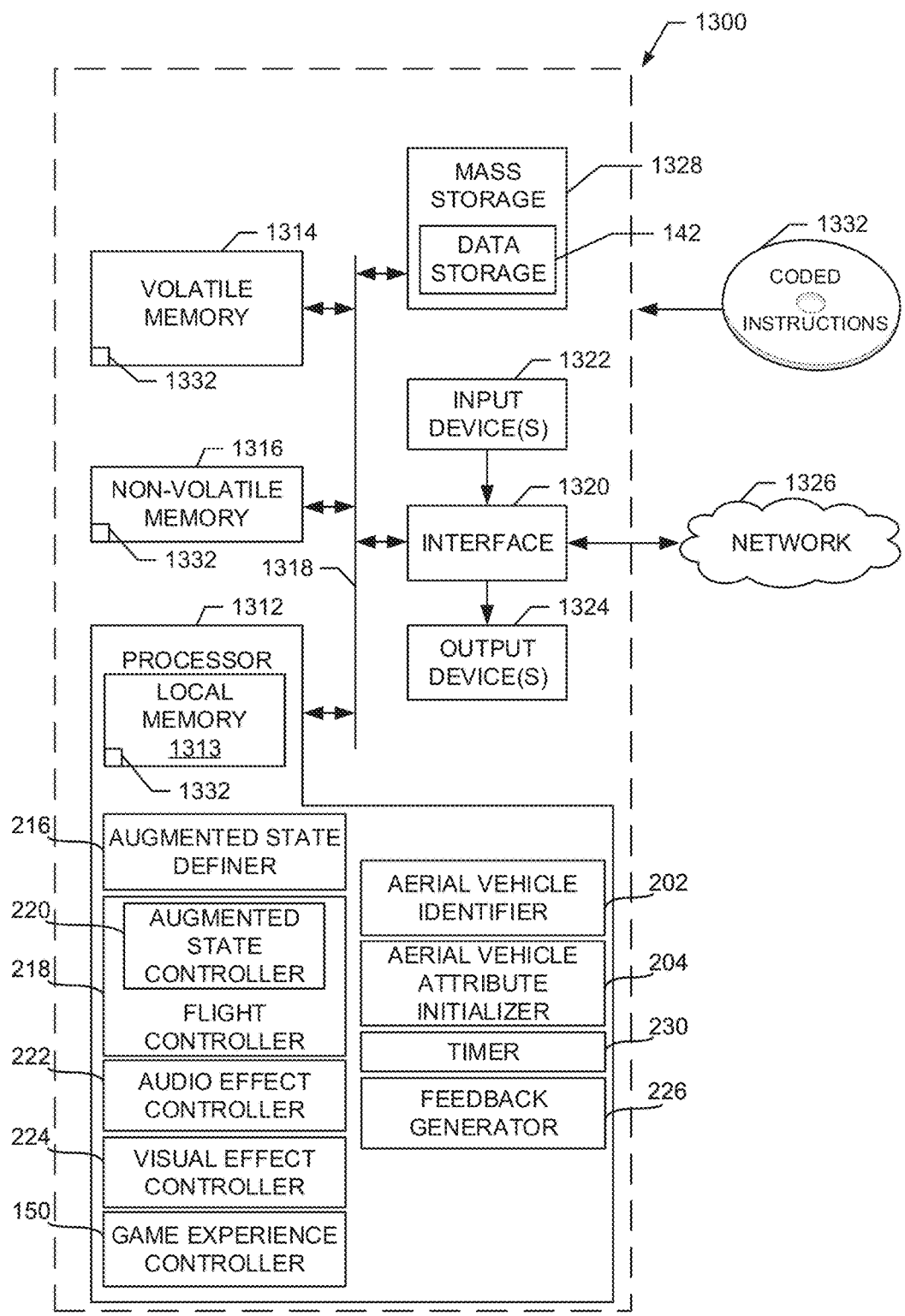
FIG. 13 is a processor platform structured to execute the instructions of FIGS. 11 and/or 12 to implement the game experience controller of FIG. 1.

FIG. 13 is a block diagram of an example processor platform 1200 structured to execute the instructions of FIGS. 11 and/or 12 to implement the game experience controller of FIG. 150. The processor platform 1200 can be, for example, a server, a personal computer, a mobile device (e.g., a cell phone, a smart phone, a tablet such as an iPad™), a personal digital assistant (PDA), an Internet appliance or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. The hardware processor may be a semiconductor based (e.g., silicon based) device. In this example, the processor implements the example aerial vehicle identifier 202, the example aerial vehicle attribute initializer 204, the example augmented state definer 216, the example flight controller 218, the example augmented state controller 220, the example audio effects controller 222, the example visual effects controller 224, the example feedback generator and the example timer 230.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIG. 11 may be stored in the mass storage device 1228, in the volatile memory 1214, in the non-volatile memory 1216, and/or on a removable tangible computer readable storage medium such as a CD or DVD.

From the foregoing, it will be appreciated that example methods, apparatus and articles of manufacture have been disclosed that relate to altering flight modes and/or flight characteristics for unmanned aerial vehicles (UAVs) and/or drones to enhance an experience for a user. In some examples, the flight modes and/or flight characteristics change the behavior and/or feel of the example UAVs using example dynamic flight controls and/or audiovisual and/or haptic elements. Some example UAVs disclosed herein are structured and/or configured to provide multiple flight modes and/or flight characteristics to advantageously enhance action, user experience and/or variety in multiple game situations.

In some examples, example virtual events can be created that dynamically affect the performance and/or flight characteristics of the UAV. For example, an example virtual cloud (e.g., a virtual green cloud) may be created in a game arena, which causes the UAVs to feel heavy and/or slow when the flying through the cloud. In some example, to determine if the UAV is affected by the virtual cloud, a controller compares the position of the UAV and the position of the virtual cloud to determine if the UAV and the cloud are within a threshold distance of one another and/or, more generally, to determine if the UAV is flying through the cloud. In such examples, if the controller determines that the UAV is flying through the cloud, an example game experience controller commands and/or causes the flight characteristics of the UAV to be modified and/or commands the UAV to implement a "slow and heavy" flying mode. In other words, in some examples, when the UAV is flying through the virtual cloud, user commands to the UAV are augmented and/or disregarded based on characteristics of the virtual cloud.

Additionally or alternatively, in some examples, if the controller determines that the UAV is flying through the cloud, feedback is provided to the user, via a display or other head-mounted display, that enables the virtual cloud to be visible to the user. Additionally or alternatively, in some examples, if the controller determines that the UAV is flying through the cloud, haptic feedback is provided to the user that enables the user to receive tactile feedback (e.g., real-time tactile feedback). Additionally or alternatively, in some examples, if the controller determines that the UAV is flying through the cloud, feedback is provided to the user including audio feedback representing an increase in motor speed to account for the additional effort exerted when navigating through the virtual cloud. In other words, the examples disclosed herein enable the user to fully perceive the virtual heaviness when the UAV enters the virtual cloud and the virtual lightness when the UAV exits the virtual cloud including augmented reality (AR), mixed reality (MR), haptics and/or audio.

In other examples, if a first UAV is participating in a dogfight with a second UAV and the controller identifies that the first UAV was hit by a virtual projectile (e.g., a bullet, a missile) shot by the second UAV, an example game experience controller commands and/or causes the flight characteristics of the first UAV to be modified and/or commands the first UAV to implement a "damaged" flying mode and/or a controlled spin representing that the first UAV was struck by the projectile. In some such examples, when the first UAV is struck by a projectile, user commands to the first UAV are augmented and/or disregarded.

Example 1

An example apparatus for use with an unmanned vehicle includes a processor to determine whether a first location of an unmanned vehicle and a second location of a virtual event is within a threshold distance; and a game experience controller to: control the unmanned vehicle based on a first command associated with a non-augmented state of the unmanned vehicle in response to the first location of the unmanned vehicle and the second location of the virtual event being outside of the threshold distance; and in response to the first location of the unmanned vehicle and the second location of the virtual event being within the threshold distance, control the unmanned vehicle based on a second command associated with an augmented state of the unmanned vehicle to simulate the unmanned vehicle being affected by the virtual event.

Example 2

In Example 1 or other examples, the game experience controller is further to execute at least one of an audio command or a visual command that simulates the unmanned vehicle being affected by the virtual event in response to the first location of the unmanned vehicle and the second location of the virtual event being within the threshold distance.

Example 3

In Examples 1, 2 or other examples, the second command is not associated with user input.

Example 4

In Examples, 1, 2, 3 or other examples, the second command is associated with the virtual event.

Example 5

In Examples, 1, 2, 3, 4 or other examples, the game experience controller is to control the unmanned vehicle based on the second command for a threshold amount of time.

Example 6

In Example 5 or other examples, in response to the threshold amount of time lapsing, the game experience controller is to control the unmanned vehicle based on a third command associated with the non-augmented state of the unmanned vehicle.

Example 7

In Examples 1, 2, 3, 4, 5, 6 or other examples, the virtual event includes at least one of a virtual viscous area, virtual smoke, a virtual tractor beam, a virtual acceleration track, a virtual bullet, a virtual propeller disabling ray, a virtual attractive hole, or a virtual protective shield.

Example 8

An example method for using an unmanned vehicle includes controlling, by executing an instruction with at least one processor, an unmanned vehicle based on a first command; identifying, by executing an instruction with the at least one processor, a first location of a virtual event; identifying, by executing an instruction with the at least one processor, a second location of the unmanned vehicle; and in response to the first and second locations being within a threshold distance, controlling, by executing an instruction with the at least one processor, the unmanned vehicle based on a second command to simulate the unmanned vehicle being affected by the virtual event.

Example 9

In Example 8 or other examples, the method includes, in response to the first and second locations being within the threshold distance, initiating at least one of a visual affect or an audio effect at the unmanned vehicle to simulate the unmanned vehicle being affected by the virtual event.

Example 10

In Examples 8, 9 or other examples, the first command is associated with a non-augmented state of the unmanned vehicle.

Example 11

In Examples 8, 9, 10 or other examples, the second command is associated with an augmented state of the unmanned vehicle.

Example 12

In Examples, 8, 9, 10, 11 or other examples, the controlling of the unmanned vehicle based on the second command includes controlling the unmanned vehicle based on the second command for a threshold amount of time.

Example 13

In Example 12 or other examples, the method includes, in response to the threshold amount of time lapsing, controlling the unmanned vehicle based on a third command associated with a non-augmented state of the unmanned vehicle.

Example 14

In Example 13 or other examples, the third command is associated with user input.

Example 15

In Examples 8, 9, 10, 11, 12, 13, 14 or other examples, the controlling of the unmanned vehicle based on the second command includes autonomously controlling the unmanned vehicle for a threshold amount of time to simulate the unmanned vehicle being affected by the virtual event.

Example 16

In Examples 8, 9, 10, 11, 12, 13, 14, 15 or other examples, the first location of the virtual event is determined by determining a virtual location of the virtual event and identifying a corresponding physical location, the physical location associated with the first location of the virtual event.

Example 17

An example tangible computer-readable medium comprising instructions that, when executed, cause a processor to, at least: control an unmanned vehicle based on a first command; identify a first location of a virtual event; identify a second location of the unmanned vehicle; and in response to the first and second locations being within a threshold distance, control the unmanned vehicle based on a second command to simulate the unmanned vehicle being affected by the virtual event.

Example 18

In Example 17 or other examples, in response to the first and second locations being within the threshold distance, the instructions, when executed, are to further cause the processor to initiate at least one of a visual affect or an audio effect at the unmanned vehicle to simulate the unmanned vehicle being affected by the virtual event.

Example 19

In Examples 17, 18 or other examples, the first command is associated with a non-augmented state of the unmanned vehicle.

Example 20

In Examples 17, 18, 19 or other examples, the second command is associated with an augmented state of the unmanned vehicle.

Example 21

In Examples 17, 18, 19, 20 or other examples, the controlling of the unmanned vehicle based on the second command is to cause the processor to control the unmanned vehicle based on the second command for a threshold amount of time.

Example 22

In Example 21 or other examples, the instructions, when executed, cause the processor to control the unmanned vehicle based on a third command associated with a non-augmented state of the unmanned vehicle in response to the threshold amount of time lapsing.

Example 23

In Example 22 or other examples, the third command is associated with user input.

Example 24

In Examples 17, 18, 19, 20, 21, 22, 23 or other examples, the instructions, when executed, cause the processor to simulate the unmanned vehicle being affected by the virtual event by autonomously controlling the unmanned vehicle for a threshold amount of time.

Example 25

In Examples 17, 18, 19, 20, 21, 22, 23, 24 or other examples the instructions, when executed, cause the processor to determine the first location of the virtual event by determining a virtual location of the virtual event and identifying a corresponding physical location, the physical location associated with the first location of the virtual event.

Example 26

An example system for use with an unmanned vehicle, the system includes: means for controlling an unmanned vehicle based on first commands; means for identifying a first location of a virtual event; means for identifying a second location of the unmanned vehicle; and means for controlling the unmanned vehicle based on second commands to simulate the unmanned vehicle being affected by the virtual event in response to the first and second locations being within a threshold of one another, Example 27

In Example 26 or other examples, the first commands are associated with a non-augmented state of the unmanned vehicle.

Example 28

In Examples 26 or 27 or other examples, the second commands are associated with an augmented state of the unmanned vehicle.

Example 29

In Examples 26, 27, 28 or other examples, the means for controlling the unmanned vehicle based on the second commands includes means for controlling the unmanned vehicle based on the second commands for a threshold amount of time.

Example 30

In Example 29 or other examples, the system includes means for controlling the unmanned vehicle based on third commands associated with a non-augmented state of the unmanned vehicle in response to the threshold amount of time lapsing.

Example 31

In Examples 26, 27, 28, 29, 30 or other examples, the means for identifying the first location of the virtual event includes means for determining a virtual location of the virtual event and identifying a corresponding physical location, the physical location associated with the first location of the virtual event.

Example 32

In Examples 26, 27, 28, 29, 30, 31 or other examples, the virtual event includes at least one of a virtual viscous area, virtual smoke, a virtual tractor beam, a virtual bullet, a virtual propeller disabling ray, a virtual attractive hole, a virtual acceleration track, or a virtual protective shield.

Example 33

In Examples 26, 27, 28, 29, 30, 31, 32 or other examples, the system includes means for executing at least one of audio commands or visual commands that simulate the unmanned vehicle being affected by the virtual event in response to the first and second locations being within a threshold of one another.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus for use with an unmanned vehicle, comprising:
    a processor to determine whether a first physical location of an unmanned vehicle is within a threshold distance of a second physical location, the second physical location corresponding to a virtual event; and
    a game experience controller to:
        control the unmanned vehicle based on a first command associated with a non-augmented state of the unmanned vehicle in response to the first physical location of the unmanned vehicle being more than the threshold distance away from the second physical location; and
        in response to the first physical location of the unmanned vehicle being within the threshold distance of the second physical location, control the unmanned vehicle based on a second command associated with an augmented state of the unmanned vehicle to simulate the unmanned vehicle being affected by the virtual event.

2. The apparatus of claim 1, wherein the game experience controller is further to execute at least one of an audio command or a visual command to simulate the unmanned vehicle being affected by the virtual event in response to the first physical location of the unmanned vehicle being within the threshold distance of the second physical location.

3. The apparatus of claim 1, wherein the second command is not associated with user input.

4. The apparatus of claim 1, wherein the second command is associated with the virtual event.

5. The apparatus of claim 1, wherein the game experience controller is to control the unmanned vehicle based on the second command for a threshold amount of time.

6. The apparatus of claim 5, wherein, in response to lapse of the threshold amount, the game experience controller is to control the unmanned vehicle based on a third command associated with the non-augmented state of the unmanned vehicle.

7. The apparatus of claim 1, wherein the virtual event includes at least one of a virtual viscous area, virtual smoke, a virtual tractor beam, a virtual acceleration track, a virtual bullet, a virtual propeller disabling ray, a virtual attractive hole, or a virtual protective shield.

8. A method of using an unmanned aerial vehicle, comprising:
    identifying, by executing an instruction with at least one processor, a first physical location corresponding to a virtual event;
    identifying, by executing an instruction with the at least one processor, a second physical location of the unmanned vehicle;
    in response to the first physical location being within a threshold distance of the second physical location, controlling, by executing an instruction with the at least one processor, the unmanned vehicle based on a first command to simulate the unmanned vehicle being affected by the virtual event; and
    in response to the first physical location not being within the threshold distance of the second physical location, controlling, by executing an instruction with the at least one processor, the unmanned vehicle based on a second command associated with the unmanned vehicle being unaffected by the virtual event.

9. The method of claim 8, further including, in response to the first physical location and the second physical location being within the threshold distance, initiating at least one of a visual affect or an audio effect at the unmanned vehicle to simulate the unmanned vehicle being affected by the virtual event.

10. The method of claim 8, wherein the second command is associated with a non-augmented state of the unmanned vehicle.

11. The method of claim 8, wherein the first command is associated with an augmented state of the unmanned vehicle.

12. The method of claim 8, wherein the controlling of the unmanned vehicle based on the first command includes controlling the unmanned vehicle based on the first command for a threshold amount of time.

13. The method of claim 12, further including, in response to the threshold amount of time lapsing, controlling the unmanned vehicle based on a third command associated with a non-augmented state of the unmanned vehicle.

14. The method of claim 13, wherein the third command is associated with user input.

15. The method of claim 8, wherein the controlling of the unmanned vehicle based on the first command includes autonomously controlling the unmanned vehicle for a threshold amount of time to simulate the unmanned vehicle being affected by the virtual event.

16. The method of claim 8, wherein the first physical location corresponding to the virtual event is determined by determining a virtual location of the virtual event and identifying the first physical location, the first physical location associated with the first virtual location of the virtual event.

17. A tangible computer-readable medium comprising instructions that, when executed, cause a processor to at least:
    identify a first physical location corresponding to a virtual event;
    identify a second physical location of an unmanned vehicle;
    in response to the first physical location being within a threshold distance of the second physical location, control the unmanned vehicle based on a first command to simulate the unmanned vehicle being affected by the virtual event; and
    in response to the first physical location not being within the threshold distance of the second physical location, control the unmanned vehicle based on a second command associated with the unmanned vehicle being unaffected by the virtual event.

18. The computer-readable medium as defined in claim 17, wherein in response to the first physical location and the second physical location being within the threshold distance, the instructions, when executed, are to further cause the processor to initiate at least one of a visual affect or an audio effect at the unmanned vehicle to simulate the unmanned vehicle being affected by the virtual event.

19. The computer-readable medium as defined in claim 17, wherein the second command is associated with a non-augmented state of the unmanned vehicle.

20. The computer-readable medium as defined in claim 17, wherein the first command is associated with an augmented state of the unmanned vehicle.

21. The computer-readable medium as defined in claim 17, wherein the controlling of the unmanned vehicle based on the first command is to cause the processor to control the unmanned vehicle based on the first command for a threshold amount of time.

22. The computer-readable medium as defined in claim 21, wherein the instructions, when executed, cause the processor to control the unmanned vehicle based on a third command associated with a non-augmented state of the unmanned vehicle in response to the threshold amount of time lapsing.

23. The computer-readable medium as defined in claim 22, wherein the third command is associated with user input.

24. The computer-readable medium as defined in claim 17, wherein the instructions, when executed, cause the processor to simulate the unmanned vehicle being affected by the virtual event by autonomously controlling the unmanned vehicle for a threshold amount of time.

25. The computer-readable medium as defined in claim 17, wherein the instructions, when executed, cause the processor to determine the first physical location corresponding to the virtual event by determining a virtual location of the virtual event and identifying the first physical location, the first physical location associated with the virtual location of the virtual event.

* * * * *